(12) United States Patent
Hosseini

(10) Patent No.: US 11,053,156 B2
(45) Date of Patent: Jul. 6, 2021

(54) METHOD OF CLOSED FORM RELEASE FOR BRITTLE MATERIALS USING BURST ULTRAFAST LASER PULSES

(71) Applicant: ROFIN-SINAR TECHNOLOGIES INC., Plymouth, MI (US)

(72) Inventor: S. Abbas Hosseini, Orlando, FL (US)

(73) Assignee: ROFIN-SINAR TECHNOLOGIES LLC, Plymouth, MI (US)

( * ) Notice: Subject to any disclaimer, the term of this patent is extended or adjusted under 35 U.S.C. 154(b) by 1033 days.

(21) Appl. No.: 14/538,648

(22) Filed: Nov. 11, 2014

(65) Prior Publication Data

US 2015/0136743 A1 May 21, 2015

Related U.S. Application Data

(60) Provisional application No. 61/906,303, filed on Nov. 19, 2013.

(51) Int. Cl.
*C03B 33/09* (2006.01)
*C03B 33/095* (2006.01)
(Continued)

(52) U.S. Cl.
CPC .......... *C03B 33/091* (2013.01); *B23K 26/082* (2015.10); *B23K 26/364* (2015.10); *B23K 26/38* (2013.01); *B23K 26/402* (2013.01); *C03B 33/0222* (2013.01); *C03B 33/0955* (2013.01); *B23K 2103/50* (2018.08); *C03B 33/04* (2013.01)

(58) Field of Classification Search
CPC .............. B23K 26/365; B23K 26/4075; B23K 26/4065

USPC ....... 219/121.61, 121.69, 121.72; 225/2, 96; 428/141, 192, 213, 220, 221; 425/174.4
See application file for complete search history.

(56) References Cited

U.S. PATENT DOCUMENTS

| 5,107,510 A | 4/1992 | Seguin et al. |
| 5,567,336 A | 10/1996 | Tatah |

(Continued)

FOREIGN PATENT DOCUMENTS

| CA | 2332154 | 9/2009 |
| CA | 2907757 | 9/2014 |

(Continued)

OTHER PUBLICATIONS

Migliore et al., Advances in Laser Singulation of Silicon, Paper #770, pp. 1-6, Coherent, Inc., Santa Clara, CA, USA; HBL Corporation, Daejeon 305-811 Korea.

(Continued)

*Primary Examiner* — Tu B Hoang
*Assistant Examiner* — Thomas J Ward
(74) *Attorney, Agent, or Firm* — Woodling, Krost and Rust

(57) ABSTRACT

A method for machining and releasing closed forms from a transparent, brittle substrate includes using a burst of ultrafast laser pulses to drill patterns of orifices in the substrate. Orifices are formed by photoacoustic compression and they extend completely or partially in the transparent substrate. A scribed line of spaced apart orifices in the transparent substrate comprise a closed form pattern in the substrate. A heat source is applied in a region about said scribed line of spaced apart orifices until the closed form pattern releases from the transparent substrate.

8 Claims, 14 Drawing Sheets

(51) Int. Cl.
  *B23K 26/364* (2014.01)
  *B23K 26/082* (2014.01)
  *C03B 33/02* (2006.01)
  *B23K 26/402* (2014.01)
  *B23K 26/38* (2014.01)
  *C03B 33/04* (2006.01)
  *B23K 103/00* (2006.01)

(56) References Cited

U.S. PATENT DOCUMENTS

| | | | |
|---|---|---|---|
| 5,609,284 | A | 3/1997 | Kondratenko |
| 6,084,897 | A | 7/2000 | Wakabayashi et al. |
| 6,407,360 | B1 | 6/2002 | Choo et al. |
| 6,552,301 | B2 | 4/2003 | Herman et al. |
| 7,033,519 | B2 | 4/2006 | Taylor et al. |
| 7,211,184 | B2 | 5/2007 | Webster et al. |
| 7,218,448 | B1 | 5/2007 | Cathey, Jr. et al. |
| 7,303,977 | B2 * | 12/2007 | Voronov ............ B23K 26/0624 438/463 |
| 7,605,344 | B2 | 10/2009 | Fukumitsu |
| 7,626,138 | B2 | 12/2009 | Bovatsek et al. |
| 8,097,830 | B2 | 1/2012 | Woeste et al. |
| 8,624,157 | B2 | 1/2014 | Albelo et al. |
| 8,835,802 | B2 | 9/2014 | Baer |
| 8,842,358 | B2 | 9/2014 | Bareman et al. |
| 8,852,698 | B2 | 10/2014 | Fukumitsu |
| 9,102,007 | B2 | 8/2015 | Hosseini |
| 9,102,011 | B2 | 8/2015 | Hosseini |
| 2002/0125232 | A1 | 9/2002 | Choo et al. |
| 2002/0195433 | A1 | 12/2002 | Troitski |
| 2003/0006221 | A1 | 1/2003 | Hong et al. |
| 2003/0072890 | A1 | 4/2003 | Miyazawa |
| 2004/0017428 | A1 | 1/2004 | Cronin et al. |
| 2004/0248503 | A1 | 12/2004 | Benderly |
| 2005/0006361 | A1 | 1/2005 | Kobayashi et al. |
| 2005/0186760 | A1 | 8/2005 | Hashimura et al. |
| 2005/0269301 | A1 | 12/2005 | Burrowes et al. |
| 2005/0272223 | A1 | 12/2005 | Fujii et al. |
| 2006/0099810 | A1 | 5/2006 | Voronov et al. |
| 2006/0108339 | A1 | 5/2006 | Nishiwaki et al. |
| 2006/0207976 | A1 | 9/2006 | Bovatsek et al. |
| 2007/0051706 | A1 | 3/2007 | Bovatsek et al. |
| 2007/0298529 | A1 | 12/2007 | Maeda et al. |
| 2009/0151996 | A1 | 6/2009 | Mishima et al. |
| 2009/0294422 | A1 | 12/2009 | Lubatschowski et al. |
| 2010/0025387 | A1 | 2/2010 | Arai et al. |
| 2010/0084384 | A1 | 4/2010 | Bovatsek et al. |
| 2010/0252959 | A1 * | 10/2010 | Lei .................... B23K 26/40 264/400 |
| 2010/0279067 | A1 * | 11/2010 | Sabia ............... C03C 23/0025 428/141 |
| 2011/0259631 | A1 | 10/2011 | Rumsby |
| 2012/0234807 | A1 * | 9/2012 | Sercel .................... B23K 26/40 219/121.69 |
| 2012/0235969 | A1 | 9/2012 | Burns et al. |
| 2013/0126573 | A1 * | 5/2013 | Hosseini ............ B23K 26/0622 225/2 |
| 2013/0183837 | A1 | 7/2013 | Arai et al. |
| 2013/0293482 | A1 | 11/2013 | Burns et al. |
| 2014/0079570 | A1 | 3/2014 | Schweitzer et al. |
| 2014/0199519 | A1 | 7/2014 | Schillinger et al. |
| 2014/0213040 | A1 | 7/2014 | Morikazu et al. |
| 2014/0248757 | A1 | 9/2014 | Morikazu et al. |
| 2014/0340730 | A1 | 11/2014 | Bergh et al. |
| 2015/0166393 | A1 | 6/2015 | Marjanovic et al. |
| 2015/0166394 | A1 | 6/2015 | Marjanovic et al. |
| 2015/0360991 | A1 | 12/2015 | Grundmueller et al. |
| 2015/0367442 | A1 | 12/2015 | Bovatsek et al. |
| 2016/0009586 | A1 | 1/2016 | Bookbinder et al. |
| 2016/0031745 | A1 | 2/2016 | Ortner et al. |
| 2016/0059359 | A1 | 3/2016 | Krueger et al. |
| 2016/0060156 | A1 | 3/2016 | Krueger et al. |

FOREIGN PATENT DOCUMENTS

| | | |
|---|---|---|
| CN | 102785031 | 4/2015 |
| EP | 2781296 | 9/2014 |
| EP | 2898982 A2 | 12/2014 |
| EP | 2868421 A1 | 5/2015 |
| EP | 2754524 | 11/2015 |
| JP | 2006305803 | 11/2006 |
| JP | 2009066627 A | 4/2009 |
| JP | 2010160734 | 7/2010 |
| JP | 4692717 | 3/2011 |
| JP | 5089735 | 9/2012 |
| JP | 5271092 | 5/2013 |
| WO | 2009114375 A2 | 9/2009 |
| WO | 2010111089 A2 | 9/2010 |
| WO | 2012006736 | 1/2012 |
| WO | 2012094737 A1 | 7/2012 |
| WO | 2014075995 | 5/2014 |
| WO | 2014079570 | 5/2014 |
| WO | 2014111385 | 7/2014 |
| WO | 2014111794 | 7/2014 |
| WO | 2014121261 | 8/2014 |
| WO | 2014134470 | 9/2014 |
| WO | 2014144322 | 9/2014 |
| WO | 2014147048 | 9/2014 |
| WO | 2014161535 | 10/2014 |
| WO | 2015075059 | 5/2015 |
| WO | 2015094994 | 6/2015 |
| WO | 2015095264 | 6/2015 |
| WO | 2016007843 | 1/2016 |
| WO | 2016010949 | 1/2016 |
| WO | 2016079063 | 5/2016 |
| WO | 2016079275 | 5/2016 |

OTHER PUBLICATIONS

Watanabe et al., Filamentation in Ultrafast Laser Material Processing, Book for Springer Series "Progress in Ultrafast Intense Laser Science", pp. 1-6.

Yoshino et al., Micromachining With a High Repetition Rate Femtosecond Fiber Laser, JLMN—Journal of Laser Micro/Nanoengineering, 2008, pp. 157-162, vol. 3, No. 3.

Rezaei, Saeid, Burst-Train Generation for Femtosecond Laser Filamentation-Driven Micromachining, Thesis, Graduatuate Department of Electrical and Computer Engineering, Jan. 2011, pp. 1-118, University of Toronto.

Nguyen et al., Optical Breakdown Versus Filamentation in Fused Silica by Use of Femtosecond Infrared Laser Pulses, Optics Letter, vol. 28, No. 17, Sep. 1, 2003, pp. 1591-1593, Department of Physics, Universite Laval, Quebec, Canada.

Nicholson, David, Laser Pulse Filamentation, Submitted Coursework for PH240, Stanford University, Nov. 27, 2011, pp. 1-4.

Zlotnicki, Steve, What Is Cutting Kerf, May 19, 2013, www.esab-cutting.com, pp. 104.

Hosseini, S. Abbas, Method and Apparatus for Non-Ablative, Photoacoustic Compression Machining in Transparent Materials Using Filamentation by Burst Ultrafast Laser Pulses, U.S. Appl. No. 13/958,346, filed Aug. 2, 2013, Applicant: Rofin-Sinar Technologies Inc.

Hosseini, S. Abbas, Method and Apparatus for Performing Laser Filamentation Within Transparent Materials, U.S. Appl. No. 14/336,819, filed Jul. 21, 2014, Applicant: Rofin-Sinar Technologies Inc.

Hosseini, S. Abbas, System for Performing Laser Filamentation Within Transparent Materials, U.S. Appl. No. 14/336,912, filed Jul. 21, 2014, Applicant: Rofin-Sinar Technologies Inc.

Hosseini, S. Abbas, Method of Fabricating a Glass Magnetic Hard Drive Disk Platter Using Filamentation by Burst Ultrafast Laser Pulses, U.S. Appl. No. 14/512,180, filed Oct. 10, 2014, Applicant: Rofin-Sinar Technologies Inc.

Hosseini, S. Abbas, Method and Apparatus for Machining Diamonds and Gemstones Using Filamentation by Burst Ultrafast Laser Pulses, U.S. Appl. No. 14/521,114, filed Oct. 22, 2014, Applicant: Rofin-Sinar Technologies Inc.

Hosseini, S. Abbas, Method and Apparatus for Hybrid Photoacoustic Compression Machining in Transparent Materials Using Filamenta-

(56) References Cited

OTHER PUBLICATIONS tion by Burst Ultrafast Laser Pulses, U.S. Appl. No. 14/520,824, filed Oct. 22, 2014, Applicant: Rofin-Sinar Technologies Inc.
Jha et al., An Integrated PCR Microfluidic Chip Incorporating Aseptic Electrochemical Cell Lysis and Capillary Electrophoresis Amperometric DNA Detection for Rapid and Quantitative Genetic Analysis, The Royal Society of Chemistry, Lab on a Chip, 2012, 12, 4455-4464.
Applied Biosystems Chemistry Guide, DNA Sequencing by Capillary Electrophoresis, Second Edition, 2009, pp. 1-250.
PE Applied Biosystems, Automated DNA Sequencing, Chemistry Guide, 1998, pp. 1-245.
Hosseini, S. Abbas, Mass Based Filtration Devices and Method of Fabrication Using Bursts of Ultrafast Laser Pulses, U.S. Appl. No. 14/531,761, filed Nov. 3, 2014, Applicant: Rofin-Sinar Technologies Inc.
Muller et al, Short-Pulse Lasers Enable Transparent Materials Processing, Industrial Photonics, Oct. 2014, pp. 8-10.
Strigin et al., Laser Processing of Glass by Picosecond Pulses, Quantum Electronics, 1994, pp. 732-735, vol. 24, No. 8, Kvantovaya Elektronika and Turpion Ltd.
Bhuyan et al., High Aspect Ratio Taper-Free Microchannel Fabrication Using Femtosecond Bessel Beams, Optics Express, Jan. 18, 2010, pp. 566-574, vol. 18, No. 2.
European Patent Office, Extended European Search Report, dated Mar. 18, 2015, pp. 1-6, Application No. 14179302.4, Applicant: Rofin-Sinar Technologies, Inc.
Chin et al., The Propagation of Powerful Femtosecond Laser Pulses in Optical Media: Physics, Applications, and New Challenges, Einstein Centennial Review Article, Can. J. Phys. vol. 83, 2005, pp. 863-905.
Hosseini et al., Measurement of a Filament Length Generated by an Intense Femtosecond Laser Pulse Using Electromagnetic Radiation Detection, Applied Physics B, 2003, pp. 583-586, vol. 76, Quebec, Canada.
Hosseini et al., Multi-Parameter Characterization of the Longitudinal Plasma Profile of a Filament: A Comparative Study, Applied Physics B, 2004, pp. 519-523, vol. 79.
Hosseini et al., Competition of Multiple Filaments During the Propagation of Intense Femtosecond Laser Pulses, The Americal Physical Society, Physical Review A 70, 033802, 2004, pp. 1-12.
Arnold et al., Laser Direct-Write Techniques for Priting of Complex Materials, MRS Bulletin, Jan. 2007, vol. 32 pp. 23-31.
Nagel et al., Laser-Induced Forward Transfer for the Fabrication of Devices, Nanomaterials: Processing and Characterization With Lasers, First Edition, 2012, Published by Wiley-VCH Verlag GMBH & Co. KGAA, pp. 255-316.
Palla-Papavlu et al., Laser Induced Forward Transfer for Materials Patterning, Romanian Reports in Physics, Aug. 2011, vol. 63, Supplement, pp. 1285-1301.
Pique et al., Digital Microfabrication by Laser Decal Transfer, JLMN—Journal of Laser Micro/Nanoengineering, 2008, vol. 3, No. 3, pp. 163-169.
European Patent Office, European Search Report, May 18, 2015, p. 1-6, Application No. 14193909.0, Applicant: Rofin-Sinar Technologies, Inc.
Gill, Jonathan, Creating an Exotic New Form of Light With Simple Optical Elements, Nov. 2014, pp. 1-21, Waldorf School of Garden City, Garden City, New York, Laser Teaching Center Department of Physics and Astronomy, Stony Brook University, Intel Science Talent Search.
Dowski et al, Extended Depth of Field Through Wave-Front Coding, Applied Optics, Apr. 10, 1995, vol. 34, No. 11, pp. 1859-1866.
Arnison et al., High Resolution Extended Depth of Field Microscopy Using Wavefront Coding, pp. 1-19.
Siviloglou, Georgios A., Accelerating Optical Airy Beams, Dissertation, 2010, pp. 1-166.
Hosseini, S. Abbas, Method and Apparatus for Forward Deposition of Material Onto a Substrate Using Burst Ultrafast Laser Pulse Energy, U.S. Appl. No. 14/542,647, filed Nov. 16, 2014, Applicant: Rofin-Sinar Technologies, Inc.
Hosseini, S. Abbas, Method and Apparatus for Spiral Cutting a Glass Tube Using Filamentation by Burst Ultrafast Laser Pulses, U.S. Appl. No. 14/547,729, filed Nov. 19, 2014, Applicant: Rofin-Sinar Technologies Inc.
Hosseini, S. Abbas, Electro/Mechanical Microchips and Method of Making With Burst Ultrafast Laser Pulses, U.S. Appl. No. 14/539,861, filed Nov. 12, 2014, Applicant: Rofin-Sinar Technologies Inc.
Hosseini, S. Abbas, Method and Apparatus for Laser Processing of Silicon by Filamentation of Burst Ultrafast Laser Pulses, U.S. Appl. No. 14/556,078, filed Nov. 28, 2014, Applicant: Rofin-Sinar Technologies, Inc.
Hosseini, S. Abbas, Method and Apparatus for Material Processing Using Multiple Filamentation of Burst Ultrafast Laser Pulses, U.S. Appl. No. 14/629,327, filed Feb. 23, 2015, Applicant: Rofin-Sinar Technologies, Inc.
Hosseini, S. Abbas, Method and System for Scribing Heat Processed Transparent Materials, U.S. Appl. No. 14/700,228, filed Apr. 30, 2015, Applicant: Rofin-Sinar Technologies, Inc.
Hosseini, S. Abbas, Method and Apparatus for Performing Laser Curved Filamentation Within Transparent Materials, U.S. Appl. No. 14/742,187, filed Jun. 17, 2015, Applicant: Rofin-Sinar Technologies, Inc.
European Patent Office, Extended European Search Report, dated Jul. 29, 2015, pp. 1-8, Application No. 14193908.2, Applicant: Rofin-Sinar Technologies, Inc.
European Patent Office, Extended European Search Report, dated Jul. 14, 2015, pp. 1-14, Application No. 14195892.6, Applicant: Rofin-Sinar Technologies, Inc.
European Patent Office, Extended European Search Report, dated Feb. 26, 2015, pp. 1-7. Application No. 14193911.6, Applicant: Rofin-Sinar Technologies, Inc.
European Patent Office, Extended European Search Report, dated Mar. 11, 2015, pp. 1-6, Application No. 14191146.1, Applicant: Rofin-Sinar Technologies, Inc.
European Patent Office, Partial European Search Report, dated May 18, 2015, pp. 1-6, Application No. 14193909, Applicant: Rofin-Sinar Technologies, Inc.
European Patent Office, Extended European Search Report, dated Sep. 14, 2015, pp. 1-7, Application No. 14179403.2, Applicant: Rofin-Sinar Technologies, Inc.

* cited by examiner

METHOD OF CLOSED FORM RELEASE FOR BRITTLE MATERIALS USING BURST ULTRAFAST LASER PULSES

This patent application claims priority to and the benefit of U.S. provisional patent application Ser. No. 61/906,303 filed Nov. 19, 2013. U.S. provisional patent application Ser. No. 61/906,303 filed Nov. 19, 2013 is incorporated herein in its entirety by reference hereto.

BACKGROUND OF THE INVENTION

The present invention relates to an improved method of releasing closed forms (interior shapes) that have been cut out of a brittle material substrate.

Currently, there are several methods for releasing geometrical shapes cut from a larger substrate sheet. Most of these methods include using a broad cut, additional release cuts to free the desired part, applying a pressing force, and, bending the substrate or pressure rolling the substrate. The problem with many of these methods is that they either leave:

a damaged or rough peripheral edge, especially when the geometric shape is a complex one; or, a weakened edge or form with a plethora of microcracks therein.

Obviously, all of these systems have some percentage of a failure rate that results in damaged/unusable released forms.

An advancement over the current state of the art for closed form release would be a method for form release that did not damage the form in any way or induce any sort of weakness to the form.

SUMMARY OF THE INVENTION

The general purpose of the present invention, which will be described subsequently in greater detail, is to provide a structure and method for releasing closed forms cut from a brittle substrate that does not weaken or damage the form.

It is a further purpose to provide an inexpensive method for closed form release that works well with scribed closed forms, has a low failure rate, and is inexpensive to perform. By scribed it is meant that the substrate includes orifices which may extend partially or completely through the transparent substrate.

It is still another purpose of the present invention to provide a method for closed form release that leaves the peripheral edges clear of any surface roughness or debris and free of microcracks.

The following specification describes novel and unique methods to cut and release closed form shapes from any transparent material such as glass, Si wafers, Sapphire or the like could also be utilized as a substrate material. The invention disclosed herein provides many advantages mentioned heretofore and many novel features.

A method for machining and releasing closed forms from a transparent substrate include the following steps: providing an ultrafast laser pulses beam comprising a burst of laser pulses; providing a laser beam delivery system capable of focusing the laser beam onto the transparent substrate and enabling relative patterned movement between the laser beam and the transparent substrate; focusing the laser beam relative to the substrate to form a beam waist external to the transparent substrate, wherein the laser pulses incident on the surface of the substrate are focused such that sufficient energy density is maintained within the transparent substrate to form a continuous laser filament therethrough without causing optical breakdown; propagating an orifice about the filament that traverses completely or partially through the transparent substrate by photoacoustic compression; directing the laser filament in the transparent substrate creating a closed form pattern in the transparent substrate comprising a scribed line of spaced apart orifices drilled into the transparent substrate; and, applying a heat source to the region of the closed form pattern in the transparent substrate comprising a scribed line of spaced apart orifices drilled into the transparent substrate until the closed form pattern releases from the transparent substrate.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements. Other objects, features and aspects of the present invention are discussed in greater detail below.

DESCRIPTION OF THE INVENTION

Figure 1:
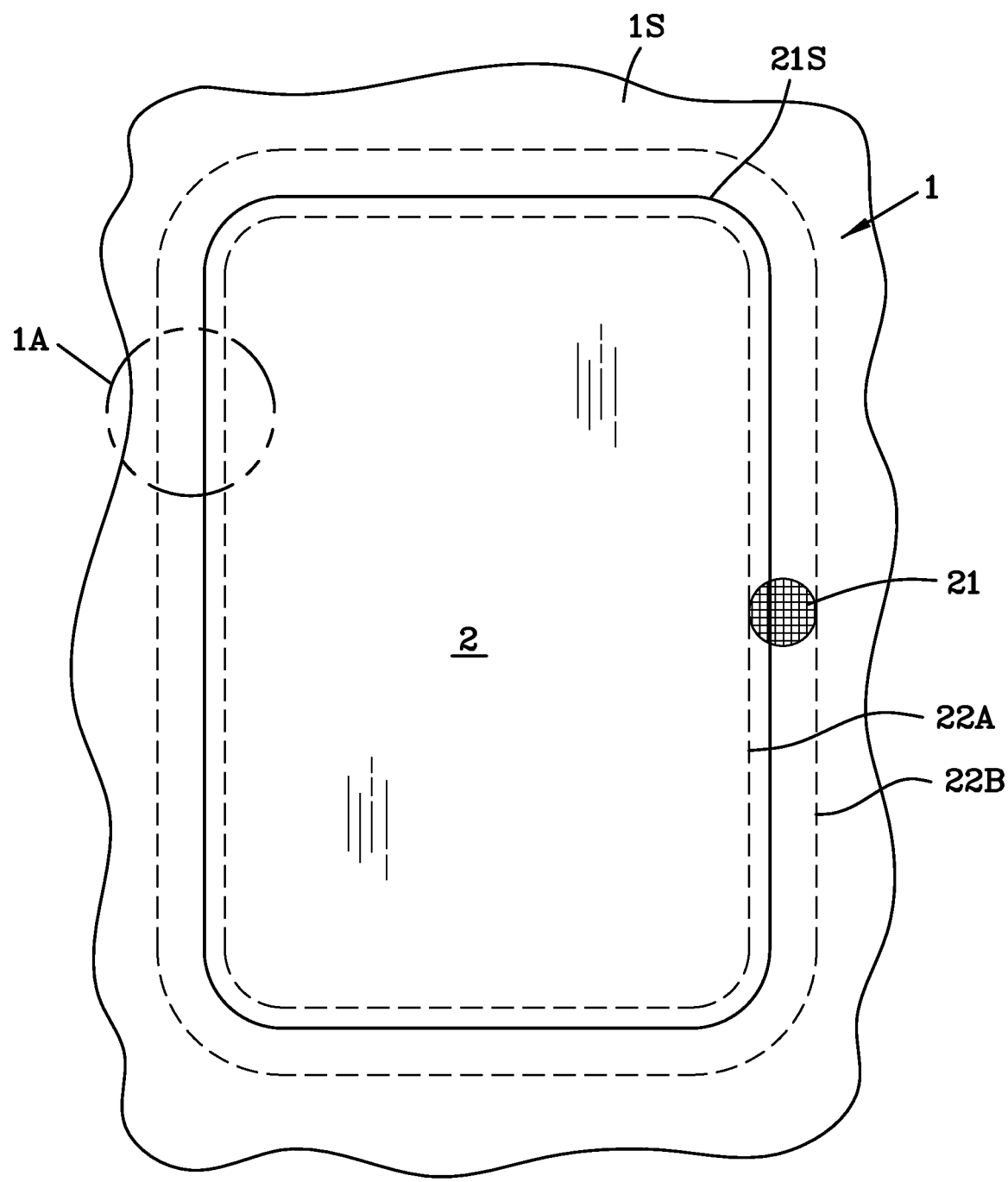
FIG. 1 is a diagrammatic illustration of a substrate with scribed closed form where the closed form is the desired part.

Transparent materials especially, but not limited to the families of glass, are common substrates from which closed forms are cut. A common example would be the intricate closed form configuration in transparent material target and may be selected from the group consisting of transparent ceramics, polymers, transparent conductors, wide bandgap glasses, crystals, crystalline quartz, diamonds (natural or man-made), sapphire, rare earth formulations, metal oxides for displays and amorphous oxides in polished or unpolished condition with or without coatings, and meant to cover any of the geometric configurations thereof such as but not limited to plates and wafers. The substrate may comprise two or more layers wherein a location of a beam focus of the focused laser beam is selected to generate filament arrays within at least one of the two or more layers. The multilayer substrate may comprise multi-layer flat panel display glass, such as a liquid crystal display (LCD), flat panel display (FPD), and organic light emitting display (OLED). The multilayer substrate may comprise an assembly of composite materials such as glass with a thin sheet of sapphire fused, doped, or glued thereto. This generally is used in an application such as cover for smart phones to enhance scratch resistance. The substrate may also be selected from the group consisting of autoglass, tubes, ampules, light bulbs and florescence light tubes, windows, biochips, hard disk drives, optical sensors, planar lightwave circuits, optical fibers, architectural glass, drinking glass ware, art glass, silicon, 111-V semiconductors, microelectronic chips, memory chips, sensor chips, electro-optical lenses, flat displays, handheld computing devices requiring strong cover materials, light emitting diodes (LED), laser diodes (LD), and vertical cavity surface emitting laser (VCSEL).

The method of closed form release for brittle materials described herein uses burst ultrafast laser pulses to create a filament that cuts or scribes the transparent material by photo-acoustic compression, completely or partially therethrough, at any angle (bevel) relative to the substrate's surface, and beginning at any location on or in a single substrate or on any of a stack array of substrates separated by gaps or not separated by gaps. The release occurs after the cutting or scribing by the application of any of the following: physical pressure (i.e. by a mechanical roller), application of a burst of a gas, application of a stream of fluid, application of a heat source such as flame, heat gun or $CO_2$ laser having a sufficient temperature differential from the substrate material to cause separation at the scribed/cut location, or application of a cold source having a sufficient temperature differential from the substrate material to cause separation at the scribed/cut location. An example of a cold source is dry ice or a spray of a fluid having a low freezing temperature. In one embodiment, the temperature applied to the perimeter of the cut may be sufficient to anneal the edge of the closed form as well as release it from the substrate.

The following description details the laser beam and the apparatus used in forming the closed forms in the substrate. The separation, once the substrate has been cut or scribed, may be performed through several different methods. The actual closed from may be cut from the substrate in several different ways: by photo-acoustic compression to create a series of through orifices about the perimeter of the shape, by continuous photo-acoustic compression to create a through cut line about the perimeter of the shape, by photo-acoustic compression to create a series of through cut lines about the perimeter of the shape, by photo-acoustic compression to create a series of stopped orifices about the perimeter of the shape, by continuous photo-acoustic compression to create a stopped cut line (scribe) about the perimeter of the shape, by photo-acoustic compression to create a series of stopped cut lines (dashed scribe) about the perimeter of the shape, by photoacoustic compression to create a series of closed voids about the perimeter of the shape, by continuous photo-acoustic compression to create a closed void cut line (internal scribe) about the perimeter of the shape, by photo-acoustic compression to create a series of closed void cut lines (internal dashed scribe) about the perimeter of the shape. These ways differ primarily in the type of scribe/cut line (partial, internal void or through) and in the length of the scribe/cut line segment (full outline, partial line outline or partial hole outline.)

The present disclosure provides devices, systems and methods for the processing of orifices in transparent materials by laser induced photoacoustic compression. Unlike previously known methods of laser material machining, embodiments of the present invention utilize an optical configuration that focuses the incident beam in a distributed manner along the longitudinal beam axis such that there is a linear alignment of the principal focus and secondary foci (coincident to the linear axis of the orifice but vertically displaced from the principal focus or focal waist) to allow the continual refocusing of the incident beam as it travels through the material thereby enabling the creation of a filament that modifies the index of refraction along the beam path in the material and does not encounter optical breakdown such that continued refocusing of the laser beam in the target material can continue over long distances.

This distributed focusing method allows for the "dumping" or reduction of unnecessary energy from the incident beam found at the principal focal waist by the creation of secondary foci by the distributed focusing elements assembly, and by positioning the location of the principal focal waist from on or in the material, to outside the material. This dumping of beam fluence combined with the linear alignment of the principal focal waist and secondary focal waists, enables the formation of filaments over distances well beyond those achieved to date using previously known methods while maintaining a sufficient laser intensity (fluence $\mu J/cm^2$) to accomplish actual modification and compression over the entire length of the filament zone. This distributed focusing method supports the formation of filaments with lengths well beyond one millimeter and yet maintaining an energy density beneath the optical breakdown threshold of the material with intensity enough so that even multiple stacked substrates can be drilled simultaneously across dissimilar materials (such as air or polymer gaps between layers of target material) with negligible taper over the drilled distance, and a relatively smooth walled orifice wall that can be initiated from above, below or within the target material.

The optical density of the laser pulse initiates a self focusing phenomena and generates a filament of sufficient intensity to non-ablative initial photoacoustic compression in a zone within/about/around the filament so as to create a linear symmetrical void of substantially constant diameter coincident with the filament, and also causes successive self focusing and defocusing of said laser pulse that coupled with the energy input by the secondary focal waists of the distributed beam forms a filament that directs/guides the formation of the orifice across or through the specified regions of the target material. The resultant orifice can be formed without removal of material from the target, but rather by a photoacoustic compression of the target material about the periphery of the orifice formed.

It is known that the fluence levels at the surface of the target are a function of the incident beam intensity and the specific distributed focusing elements assembly, and are adjusted for the specific target material(s), target(s) thickness, desired speed of machining, total orifice depth and orifice diameter. Additionally, the depth of orifice drilled is dependent on the depth over which the laser energy is absorbed, and thus the amount of material removed by a single laser pulse, depends on the material's optical properties and the laser wavelength and pulse length. For this reason a wide range of process parameters are listed herein with each particular substrate and matching application requiring empirical determination for the optimal results with the system and materials used. As such, the entry point on the target may undergo some minimal ablative ejecta mound formation if the fluence levels at the surface are high enough to initiate momentary, localized ablative (vaporized) machining, although this plasma creation is not necessary. In certain circumstances it may be desirable to utilize a fluence level at the target surface that is intense enough to create the transient, momentary ablative drilling to give a broad bevelled entry yet have the remainder of the orifice of uniform diameter as would be created by a distributed focus hybrid drilling method using an energy level that permits a momentary ablative technique followed by a continual photoacoustic compression technique. This can be accomplished by the present invention by selection of a fluence level at the target surface that balances the linear absorption against the non linear absorption of the beam in the material such that the fluence level required for ablative machining will be exhausted at the desired depth of the bevelled (or other geometric configuration). This hybrid technique will result in a minor ejecta mound that can be eliminated if a sacrificial layer is applied to the target surface. Common sacrificial layers are resins or polymers such as but not limited to PVA, Methacrylate or PEG, and generally need only be in the range of 1 to 300 microns thick (although the 10-30 micron range would be utilized for transparent material machining) and are commonly applied by spraying the sacrificial layer onto the target material. The sacrificial layer will inhibit the formation of an ejecta mound on the target by preventing molten debris from attaching itself to the surface, attaching instead to the removable sacrificial material as is well known in the art.

To accomplish photoacoustic compression machining requires the following system:

A burst pulse laser system capable of generating a beam comprising a programmable train of pulses containing from 1 to 50 subpulses within the burst pulse envelope. Further the laser system needs to be able to generate average power from 1 to 200 watts depending on the target material utilized, typically this range would be in the range of 50 to 100 watts for borosilicate glass.

A distributed focusing element assembly (potentially comprising positive and negative lenses but having a positive focusing effect in the aggregate) capable of producing a weakly convergent, multi foci spatial beam profile where the incident fluence at the target material is sufficient to cause Kerr-effect self-focusing and propagation.

An optical delivery system capable of delivering the beam to the target.

Commercial operation would also require translational capability of the material (or beam) relative to the optics (or vice versa) or coordinated/compound motion driven by a system control computer.

The use of this system to drill orifices or vias by photoacoustic compression requires the following conditions be manipulated for the specific target/s: the properties of the distributed focus element assembly; the burst pulsed laser beam characteristics; and the location of the principal focus.

The distributed focus element assembly may be of a plethora of generally known focusing elements commonly employed in the art such as aspheric plates, telecentric lenses, non-telecentric lenses, aspheric lenses, annularly faceted lenses, custom ground aberrated (non-perfect) lenses, a combination of positive and negative lenses or a series of corrective plates (phase shift masking), any optical element tilted with respect to the incident beam, and actively compensated optical elements capable of manipulating beam propagation as well as any number of optical elements that produce a significantly non-ideal, non-gaussian beam intensity profile. The principal focal waist of a candidate optical element assembly as discussed above, generally will not contain more than 90% nor less than 50% of incident beam fluence at the principal focal waist. Although in specific instances the optical efficiency of the distributed focus element assembly may approach 99%. A non-aspherical, aberrated lens would be used in the aforementioned process. The actual optical efficiency of the distributed focus element assembly will have to be fine-tuned for each specific application. The users will create a set of empirical tables tailored for each transparent material, the physical configuration and characteristics of the target as well as the specific laser parameters—these tables can be computerized and used to drive a system via a central or distributed control architecture.

Silicon Carbide, Gallium Phosphide, sapphire, strengthened glass etc., each has its own values. This table is experimentally determined by creating a filament within the material (adjusting the parameters of laser power, repetition rate, focus position and lens characteristics as described above) and ensuring that there is sufficient fluence to induce a plane of cleavage or axis of photoacoustic compression to create an orifice.

A sample optical efficiency for drilling a 1 micron diameter through orifice in a 2 mm thick single, planar target made of borosilicate, using a 50 Watt laser outputting 5 pulses (at 50 MHz) in each burst with 50 µJ energy having a frequency (repetition rate) that would lie in the 200 kHz range is 65% wherein the principal focal waist of the beam resides up to 500 µm off of the desired point of initiation.

It is to be noted that there is also a set of physical parameters that must be met by this photoacoustic compression drilling process. The beam spot diameter is greater than the filament diameter which is greater than the orifice diameter. Additionally the distributed beam's primary focal waist is never in or on the surface of the target material into which a filament is created.

The location of the principal focal waist is generally in the range of 5 to 500 µm off of the desired point of initiation. This is known as the energy dump distance. It also is determined by the creation an empirical table tailored for each transparent material, the physical configuration and characteristics of the target as well as the laser parameters. It is extrapolated from the table created by the method noted above.

One example of the laser beam energy properties are as follows: a pulse energy in the beam between 5 µJ to 100 µJ at the repetition rate from 1 Hz to 2 MHz (the repetition rate defines the speed of sample movement and the spacing between neighboring filaments). The diameter and length of the filament may be adjusted by changing the temporal energy distribution present within each burst envelope.

Herein, burst picosecond pulsed light is used because the total amount of energy deposited in the target material is low and photoacoustic compression can proceed without cracking the material, and less heat is generated in the target material thus efficient smaller packets of energy are deposited in the material so that the material can be raised incrementally from the ground state to a maximally excited state without compromising the integrity of the material in the vicinity of the filament.

The actual physical process occurs as described herein. The principal focal waist of the incident light beam of the pulsed burst laser is delivered via a distributed focusing element assembly to a point in space above or below (but never within) the target material in which the filament is to be created. This will create on the target surface a spot as well as white light generation. The spot diameter on the target surface will exceed the filament diameter and the desired feature (orifice, slot, etc.) diameter. The amount of energy thus incident in the spot on surface being greater than the critical energy for producing the quadratic electro-optic effect (Kerr effect—where the change in the refractive index of the material is proportional to the applied electric field) but is lower that the critical energy required to induce ablative processes and more explicitly below the optical breakdown threshold of the material. Photoacoustic compression proceeds as a consequence of maintaining the required power in the target material over time scales such that balancing between the self-focusing condition and plasma defocusing condition can be maintained. This photoacoustic compression is the result of a uniform and high power filament formation and propagation process whereby material is rearranged in favor of removal via ablative processes. The extraordinarily long filament thus produced is fomented by the presence of spatially extended secondary foci created by the distributed focusing element assembly, maintaining the self focusing effect without reaching optical breakdown. In this assembly, a large number of marginal and paraxial rays converge at different spatial locations relative to the principal focus. These secondary foci exist and extend into infinite space but are only of useful intensity over a limited range that empirically corresponds to the thickness of the target. By focusing the energy of the second foci at a lower level below the substrate surface but at the active bottom face of the filament event, allows the laser energy access to the bulk of the material while avoiding absorption by plasma and scattering by debris.

The distributed focal element assembly can be a single aberrated focal lens placed in the path of the incident laser beam to develop what appears to be an unevenly distributed focus of the incident beam into a distributed focus beam path containing a principal focal waist and a series of linearly arranged secondary focal waists (foci). The alignment of these foci is collinear with the linear axis of the orifice. Note that the principal focal waist is never on or in the target material. The principal focal waist is above the target material or it is below the target material as the orifice may be initiated above or below the principal focal waist by virtue of the symmetric and non-linear properties of the focused beam. Thus a beam spot (approximately 10 μm distance) resides on the surface of the target and the weaker secondary focal waists collinearly reside within the target because the material acts as the final optical element creating these focal points as the electric field of the laser alters the indices of refraction of the target. This distributed focus allows the amount of laser energy to be deposited in the material so as to form a filament line or zone. With multiple linear aligned foci and by allowing the material to act as the final lens, the target material when bombarded with ultrafast burst pulse laser beams, undergoes numerous, successive, localized heatings which thermally induced changes in the material's local refractive index (specifically, the complex index) along the path of the liner aligned foci causing a lengthy untapered filament to be developed in the target followed by an acoustic compression wave that annularly compresses the material in the desired region creating a void and a ring of compressed material about the filamentation path. Then the beam refocuses and the refocused beam combined with the energy at the secondary focal waists maintains the critical energy level and this chain of events repeats itself so as to drill an orifice capable of 1500:1 aspect ratio (length of orifice/diameter of orifice) with little to no taper and an entrance orifice size and exit orifice size that are effectively the same diameter. This is unlike the prior art that focuses the energy on the top surface of or within the target material resulting in a short filamentation distance until the optical breakdown is reached and filamentation degrades or ceases.

The drilling of orifices in the bottom two of three planar targets in a stacked configuration with an air gap between them occurs wherein the principal focal waist is positioned below the final target. The hole can be drilled from the top or the bottom or the middle of a multiple layer setup, but the drilling event always occurs the same distance from the principal focal waist if the same lens set and curvature is used. The focal waist is always outside of the material and never reaches the substrate surface.

The method of drilling orifices through photoacoustic compression is accomplished by the following sequence of steps:

1. passing laser energy pulses from a laser source through a selected distributive-focus lens focusing assembly;
2. adjusting the relative distance and or angle of said distributive-focus lens focusing assembly in relation to a laser source so as to focus the laser energy pulses in a distributed focus configuration to create a principal focal waist and at least one secondary focal waist;
3. adjusting the principal focal waist or the target such that the principal focal waist will not reside on or in the target that is being machined;
4. adjusting the focus such that the spot of laser fluence on the surface of the target that is located below or above said principal focal waist, has a diameter that is always larger than a diameter of a filamentation that is formed in the target;
5. adjusting the fluence level of the secondary focal waists are of sufficient intensity and number to ensure propagation of a photoacoustic compressive machining through the desired volume of the target;
6. applying at least one burst of laser pulses (1-50 pulses/subpulses) of a suitable wavelength, suitable burst pulse repetition rate and suitable burst pulse energy from the laser source to the target through the selected distributive-focus lens focusing assembly, wherein the total amount of pulse energy or fluence, applied to the target at a spot where the laser pulse contacts the point of initiation of machining on the target, is greater that the critical energy level required to initiate and propagate photoacoustic compression machining, yet is lower than the threshold critical energy level required to initiate ablative machining; and
7. stopping the burst of laser pulses when the desired machining has been completed.

As mentioned earlier, there may be specific orifice configurations wherein a tapered entrance to the orifice may be desired. This is accomplished by initiation of the orifice with a laser fluence level that is capable of ablative machining for a desired distance and completing the drilling with a laser fluence level below the critical level for ablative machining yet above the critical level for photoacoustic machining to the desired depth in that material. This type of orifice formation may also utilize the application of a removable sacrificial layer on the surface of the target. This would allow the formation of the ejecta mound onto the sacrificial layer such that the ejecta mound could be removed along with the sacrificial layer at a later time. Such an orifice drilled by a hybrid ablative and photoacoustic compression method of machining would be performed through the following steps, although the application of the sacrificial layer need be utilized and if utilized need not occur first:

1. applying a sacrificial layer to at least one surface of a target;
2. passing laser energy pulses from a laser source through a selected distributive-focus lens focusing assembly;
3. adjusting the relative distance and or angle of said distributive-focus lens focusing assembly in relation to a laser source so as to focus the laser energy pulses in a distributed focus configuration to create a principal focal waist and at least one secondary focal waist;
4. adjusting the principal focal waist or the target such that the principal focal waist will not reside on or in the target that is being machined;
5. adjusting the focus such that the spot of laser fluence on the surface of the target that is located below or above said principal focal waist;
6. adjusting the spot of laser fluence on the surface of the target such that it has a diameter that is always larger than a diameter of a filamentation that is to be formed in the target;
7. ensuring the fluence level of the secondary focal waists are of sufficient intensity and number to ensure propagation of a photoacoustic compressive machining through the desired volume of the target; and
8. applying at least one burst of laser pulses (1-50 pulses/subpulses) of a suitable wavelength, suitable burst pulse repetition rate and suitable burst pulse energy from the laser source to the target through the selected distributive-focus lens focusing assembly, wherein the total amount of pulse energy or fluence, applied to the target at a spot where the laser pulse contacts the point of initiation of machining on the target, is greater that the critical energy level required to initiate ablative machining to the desired depth and thereinafter the fluence energy at the bottom of the ablatively drilled orifice is greater than the critical energy level to initiate and propagate a filamentation and photoacoustic compression machining, yet is lower than the threshold critical energy level required to initiate ablative machining; and
9. stopping the burst of laser pulses and filamentation when the desired machining has been completed.

The various parameters of the laser properties, the location of the principal focal waist, and the final focusing lens arrangements as well as the characteristics of the orifice created are set forth in the following table. It is to be noted that they are represented in ranges as their values vary greatly with the type of the target material, its thickness and the size and location of the desired orifice. The following table includes parameters used in photoacoustic compression machining of orifices for closed form applications.

| Laser Properties | |
| --- | --- |
| Wavelength | 5 microns or less |
| Pulse width | 10 nanoseconds or less |
| Freq (laser pulse repetition rate) | 1 Hz to 2 MHz |
| Average power | 200-1 watt |
| Number of sub pulses per burst | 1 to 50 |
| Sub pulse spacing | 1 nanosecond to 10 microsecond |
| Pulse energy | 5 micro Joules (µJ) to 500 micro Joules (µJ) (Average power/repetition rate) watts/1/sec |
| Orifice Properties | |
| Min Orifice Diameter | .5 microns |
| Max Orifice Diameter | 50 microns |
| Max Orifice Depth | 10 mm in borosilicate glass |
| Typical Aspect Ratio | 1500:1 |
| Max Aspect Ratio | 3000:1 |
| Orifice Sidewall Smoothness (Material Independent) | <5 micron ave. roughness (e.g., Si, SiC, SiN, GaAs, GaN, InGaP) |
| Orifice Side Wall Taper (Material Independent) | Negligible across 10,000 micron depth |
| Beam Properties | |
| Focal Distribution | −5 to 4,000 |
| $M^2$ | 1.00-5.00 |

As noted earlier the parameters above vary with the target. In the way of an operational example, to drill a 3 micron hole 2 mm deep in a transparent substrate the following apparatus and parameters would be used: a 1064 nm wavelength laser, 64 Watts average power, 100 kHz repetition rate, 80 µJ pulse energy, and, 8 subpulses at a frequency of 50 MHz within the burst envelope.

The pulse power assuming a pulse width of 10 picoseconds, for example, is 80 µJ divided by 10 picoseconds, which yields 8 MW (MW=Mega Watts). This would be focused with an aberrated lens delivering distributed foci over 2 mm of space (filament active zone is 2 mm long) focusing 5 to 500 µm above or below the surface of the substrate.

FIG. 1 is a diagrammatic illustration of a substrate with scribed closed form where the closed form is the desired part. The closed form (desired part) is the part in the middle of FIG. 1 denoted by reference numeral 2.

There are clearly two strategies when the main body or closed form is the desired part. As shown in FIG. 1, product 2 is the closed form that is the desired part formed via filamentation scribing on the main substrate 1. Referring to FIG. 1, solid line 21S represents the scribed line which is cut into the surface 1S of the substrate 1. $CO_2$ laser spot 21 heats the substrate surrounding in the vicinity of the scribed line 21S in the ratio of about 75-25% shown by dashed lines 22A, 22B. Depending on the workpiece, the $CO_2$ laser spot size is adjusted from 100 µm to 10 mm. As an example when making a smartphone cover glass or auto windshield, mirrors, architectural windows, etc., the spot size is set to 8 mm, this is achieved by having a telecentric lens with about 1000 mm focal length (have very big field) where the geometrical focus is set well above the target to have very big spot size on the scribed line.

Still referring to FIG. 1, two (2) mm of the 8 mm spot diameter of the $CO_2$ laser stays inside the cut 21S and six (6) mm of the 8 mm spot diameter of the $CO_2$ laser is outside the cut 21S. The frame is heated as much as possible to cause the separation of the closed form (the desired part) from the frame. The outer part, the cullet, is heated more and expands creating a cleave line along the filament scribe line 21S.

Figure 1A:
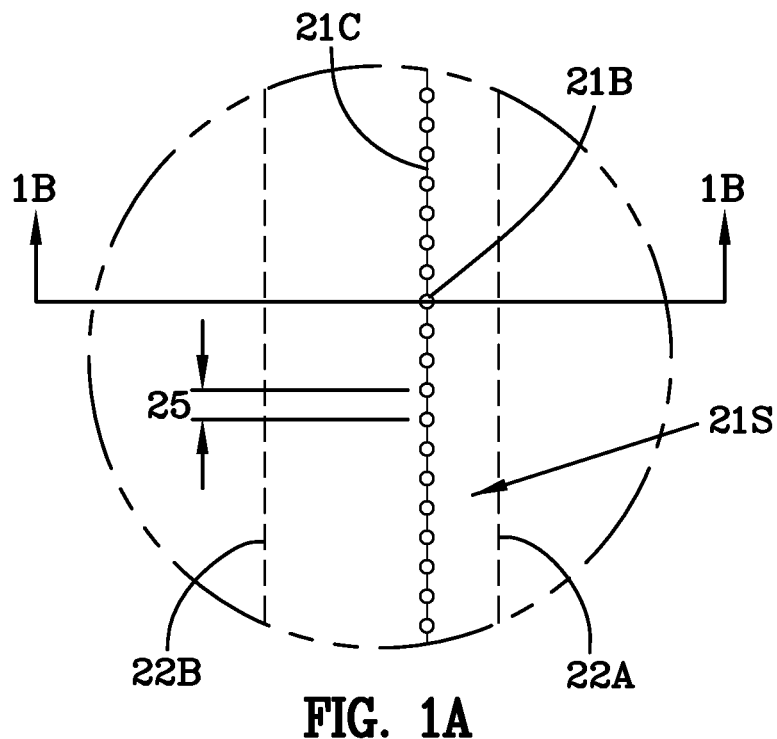
FIG. 1A is an enlarged portion of FIG. 1 illustrating the spacing between orifices/holes.

FIG. 1A is an enlarged portion of FIG. 1 illustrating the spacing between holes (orifices) 21B. Orifices 21B are approximately 1 µm diameter. Microcracks 21C are illustrated between the orifices 21B in FIG. 1A. Microcracks 21C are created by a shock wave due to photoacoustic compression. The spacing between the holes (orifices) is 2-10 µm center to center as illustrated by reference numeral 25 depending on the type of form (sample type), substrate thickness and orifice depth.

Figure 1B:
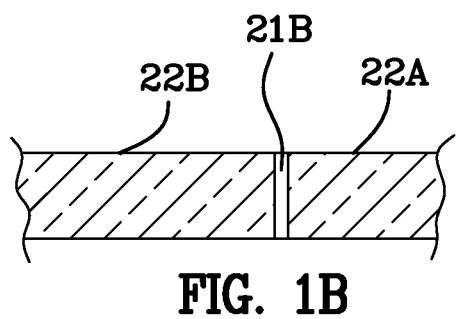
FIG. 1B is a diagrammatic cross-sectional view taken along the lines of 1B-1B of FIG. 1A.

FIG. 1B is a diagrammatic cross-sectional view taken along the lines of 1B-1B of FIG. 1A. Orifice 21B extends completely through the substrate. Orifices can begin at the bottom of the substrate and extend upwardly toward the top of the substrate but not extend through the substrate. Orifices can extend from the bottom of the substrate to within 5-100 µm of the top surface of the substrate. All of the orifices drilled in the transparent substrate are substantially cylindrically shaped with no taper. In all examples of orifice depth, $CO_2$ laser cleaving works.

Figure 2:
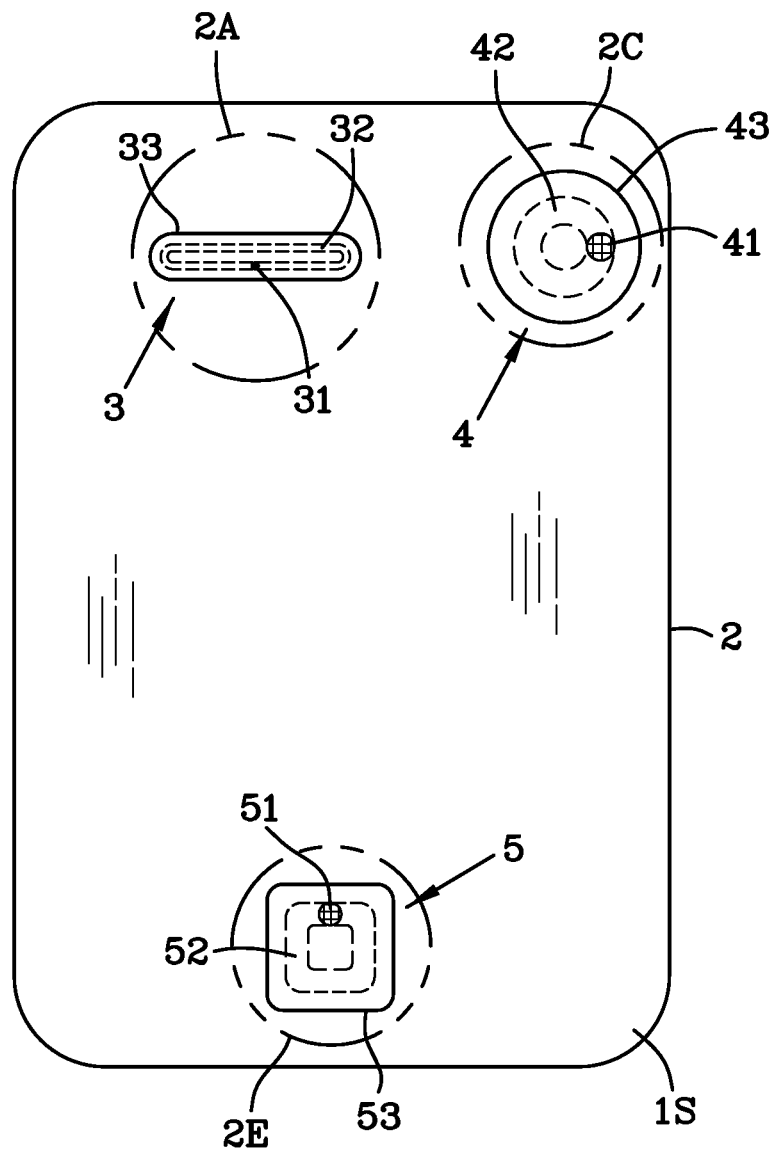
FIG. 2 is a diagrammatic illustration of a substrate with scribed closed form where the body is the desired part and internal feature will be cut out.

FIG. 2 is a diagrammatic illustration of a substrate 1S with scribed closed forms, 33, 43, and 53 where the body 1s is the desired part and the internal feature(s) are cut out (removed from the substrate). As shown in FIG. 2, when the closed forms such as any one or a combination of slot 3, circle 4 and cutout 5 made on the part 2 is not the desired part, any one or a combination of slot 3, circle 4 and cutout 5 can be melted and destroyed, to release any one or a combination of slot 3, circle 4 and cutout 5 from the main body. Center of slot 3, circle 4 or cutout 5 are heated 31, 41 or 51 by a $CO_2$ laser spot. A Galvo scanner moves the laser spots in paths 32, 42 or 52 multiple times to reach the melting point and cause the deformation of the closed form. This deformation leads to expansion of the closed form part and when the part cools down due to contraction, separation happens along the filament scribed line and the inner closed form drops by itself under its own weight. For the slot closed form configuration, the laser spot size is set to less than 1 mm and a Galvo scanner draws a path to melt the substrate within the scribed line of orifices 33 and releases the form bounded by the line of orifices 33 from the main body 1S. For the cutout 5, the spot size of the laser is set to 2 mm. The spot size of the laser is not a limiting factor and may be as large as possible as long as it remains inside the closed form to be removed from the substrate.

Circles (circular cut outs), for example, can be released with radii from 1 to 50 mm by creating a zone of photoacoustic compressed material in the substrate, then applying constant heat to the center of the circle while a moving heat source traces the circumference or perimeter of the circle. A hot zone is created at the center of the circle. A hot zone is intermittently created along the zone of the photoacoustically compressed material. Heating of the center of the circle continues until it begins to soften and the heating process stops. Upon radiant and convection cooling, the heated circle shrinks. This induces the closed form shape to spontaneously release from the substrate, rendering a low damage, high quality, cut face with no additional stress created by the release and separation process. In this configuration laser spot size set to less than 2 mm and the Galvo scanner draws a path to melt the substrate and release it from main body.

Figure 2A:
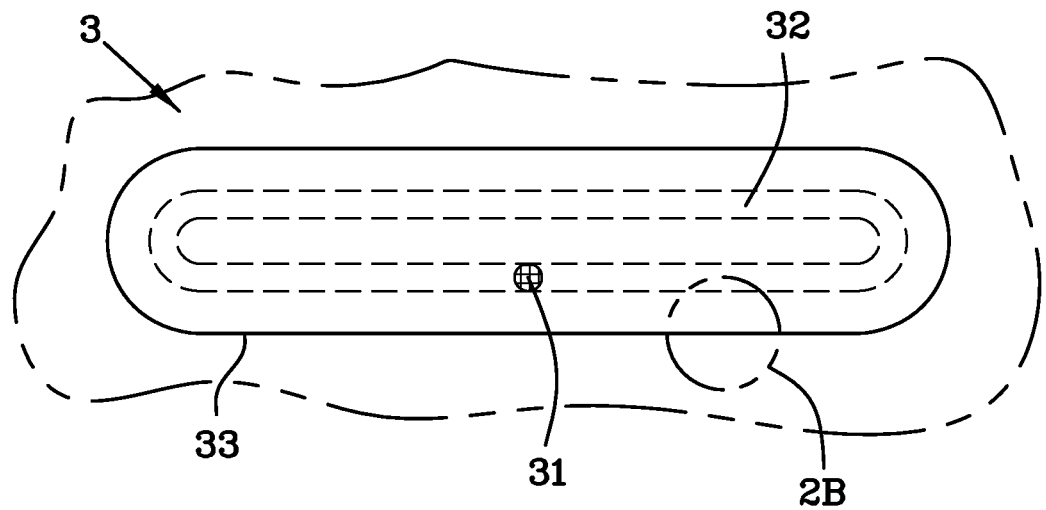
FIG. 2A is an enlargement of the slot illustrated in FIG. 2.
Figure 2B:
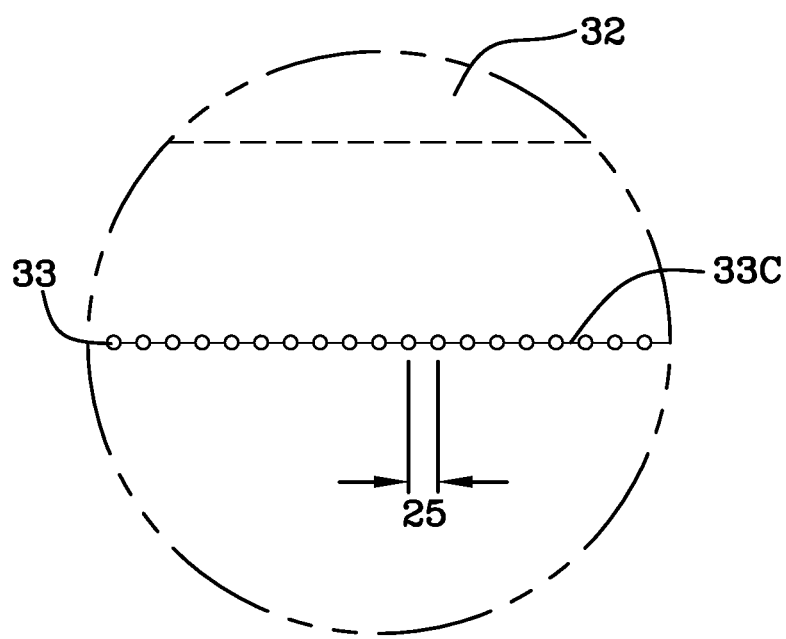
FIG. 2B is an enlargement of a portion of FIG. 2A illustrating orifices and the path of the heat source.
Figure 2C:
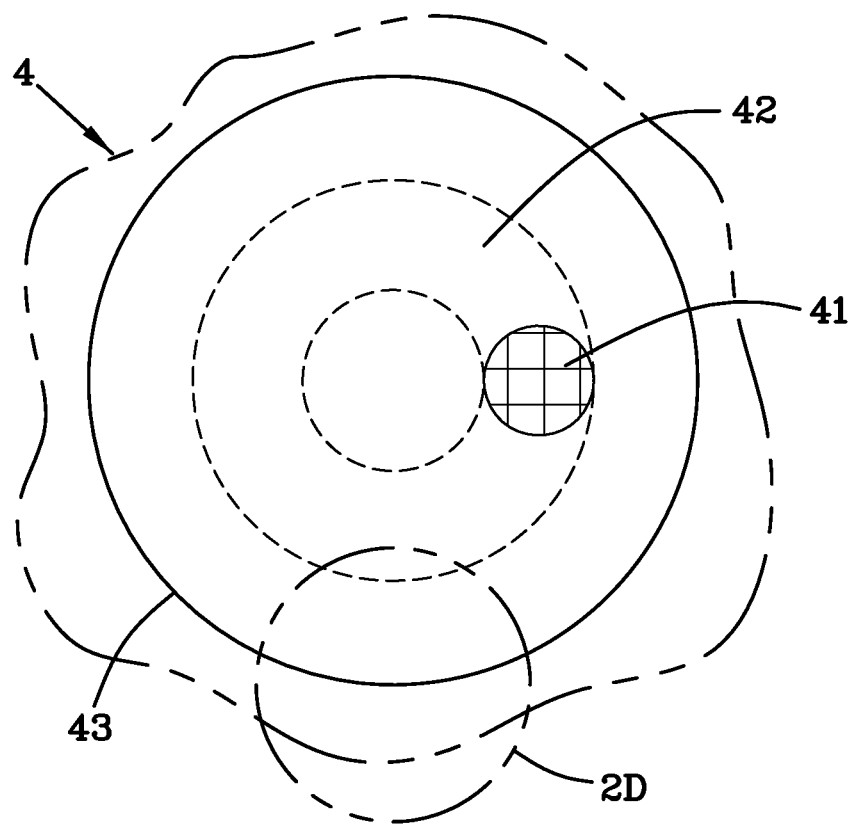
FIG. 2C is an enlargement of the circle cutout illustrated in FIG. 2.
Figure 2D:
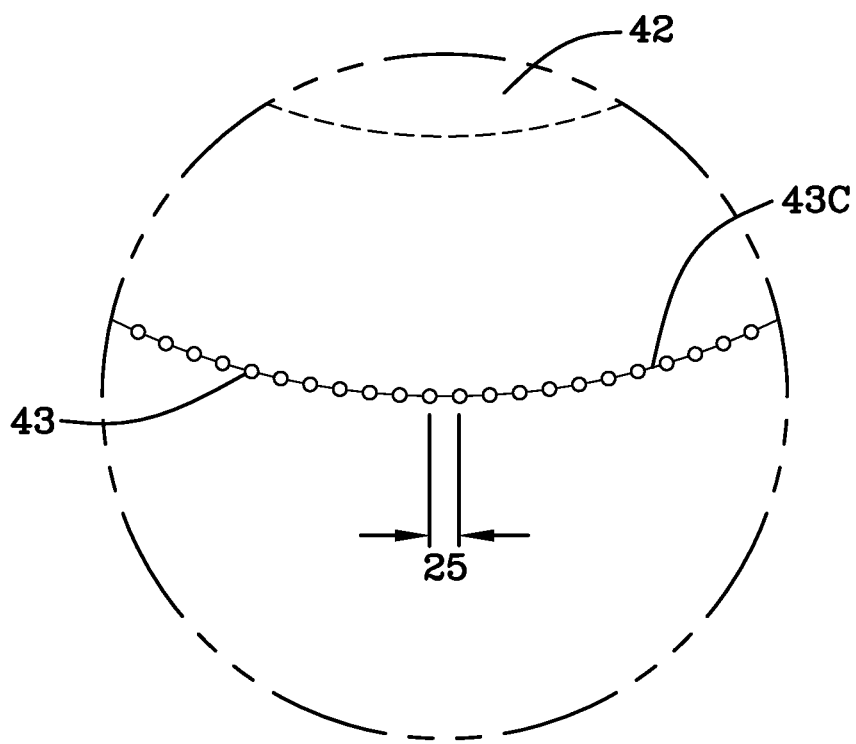
FIG. 2D is an enlargement of a portion of FIG. 2C illustrating orifices and the path of the heat source.
Figure 2E:
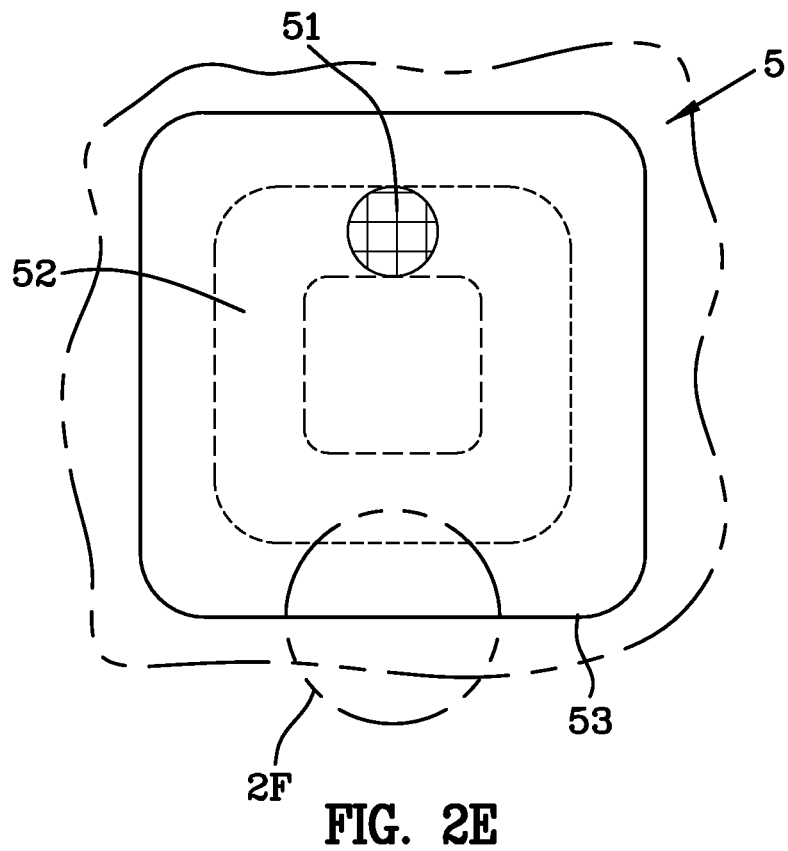
FIG. 2E is an enlargement of the square cutout of FIG. 2.
Figure 2F:
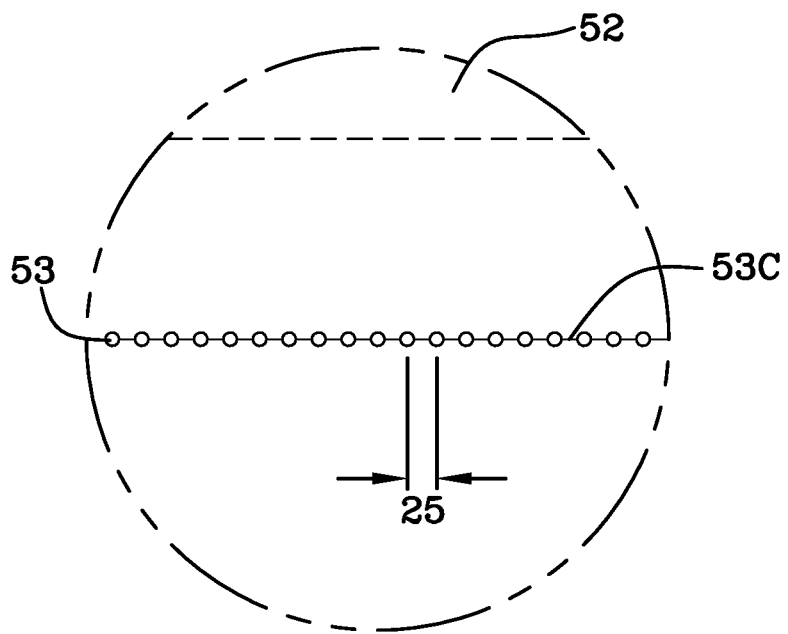
FIG. 2F is an enlargement of a portion of FIG. 2E illustrating orifices and the path of the heat source.

FIG. 2A is an enlargement of the slot 3 illustrated in FIG. 2. FIG. 2B is an enlargement of a portion of FIG. 2A illustrating orifices 33 and the path 32 of the heat source. Microcracks 33C are illustrated between the orifices 33 in FIG. 2B. FIG. 2C is an enlargement of the circle cutout 4 illustrated in FIG. 2. FIG. 2D is an enlargement of a portion of FIG. 2C illustrating orifices 43 and the path of the heat source 42. Microcracks 43C are illustrated between the orifices 43 in FIG. 2D. FIG. 2E is an enlargement of the square cutout 5 of FIG. 2. FIG. 2F is an enlargement of a portion of FIG. 2E illustrating orifices 53 and the path 52 of the heat source. Microcracks 53C are illustrated between the orifices 53 in FIG. 2F. In all of the examples the heat source may be a $CO_2$ laser heat source or some other heat source.

Figure 3:
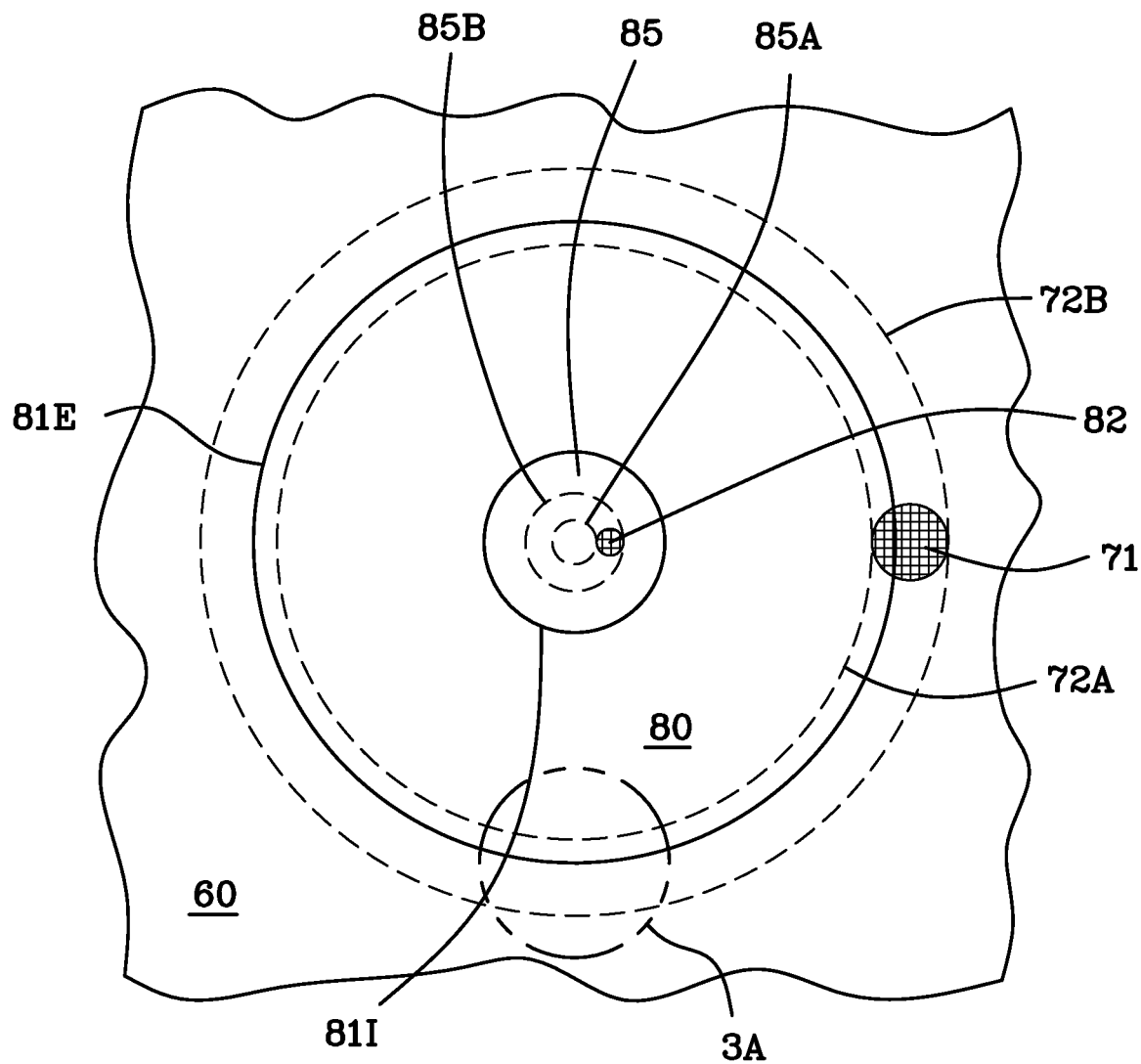
FIG. 3 is another diagrammatic illustration of a closed form release.

Scribing glass in two circles to form a disk used for hard disk drive is challenging for industry. In the related art, after diamond roller scribing, facet quality is very poor necessitating grinding that adds to product cost. FIG. 3 is another diagrammatic illustration of a closed form release. After the substrate is scribed, the platter is released from the main body (main portion) of the substrate 60 and also the central disk 85 is also released from the platter.

Figure 3A:
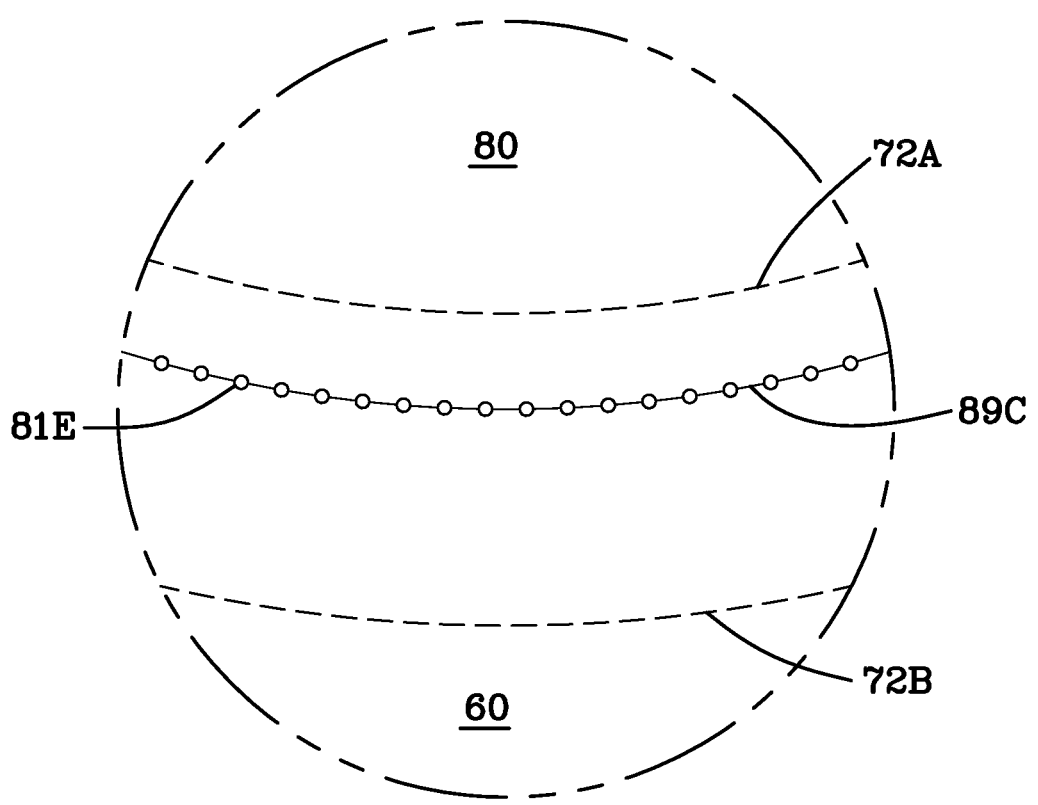
FIG. 3A is an enlargement of a portion of FIG. 3 illustrating orifices and the path of the heat source.

FIG. 3A is an enlargement of a portion of FIG. 3 illustrating orifices 81E and the path of the heat source. Microcracks 89C are illustrated between the orifices in FIG. 3A. Orifices 81E may extend partially through substrate 60 or partially through substrate 60 as described above. All of the orifices 81E drilled in the transparent substrate are substantially cylindrically shaped with no taper.

Reference numeral 81I represents an inner scribed line in the shape of a circle and reference numeral 81E represents an outer scribed line in the shape of a circle. By scribed it is meant that the substrate includes orifices which may or may not extend completely through the substrate. A $CO_2$ laser that has about 200 kW power is used to create a heat zone for material expansion in the main body 60 and release line formation. For example, where the closed form to be released is the center of the disk cutout 85, it is heated up to almost the melting point of the substrate 60. Due to heat expansion of the substrate followed by cooling of the substrate, followed by contraction of the central disk 85, the central disk 85 drops under its own weight or by minor touch of an air nozzle, mechanical finger pressure, or some other automated device. Where the goal is to release the platter 80 from the main body (main portion) of the substrate 60, the scribed perforated line 81E heats up as such to avoid any damage. The $CO_2$ spot size 71 is about 10 mm in diameter and more than 70% of the beam resides on the main body (main portion) 60 of the substrate to ensures its expansion. A cleave line forms along the scribe line 81E and the disk releases from the main body 60 of the substrate with extremely high quality and no chipping or facet damage.

Scribed circles 81I, 81E are made in a matter of a second in the glass substrate 60 by the method of ultrafast burst filamentation to form perforations in the shapes of the circles. The laser spots 71 and 82, in multiple scans along the paths 85A, 85B and 72A, 72B results in a final product in a matter of a few seconds. The central circle 85 drops by itself under its own weight or just an air pressure or mechanical finger touch, and the disk 80 also releases from the cullet frame.

Still referring to FIG. 3, disk 80 is cut with a precision of 1 µm and with a facet roughness less than 1 µm. Since ultrafast burst filament scribing cuts the parts without any microcracks or edge chipping, there is no need for grinding.

Figure 4:
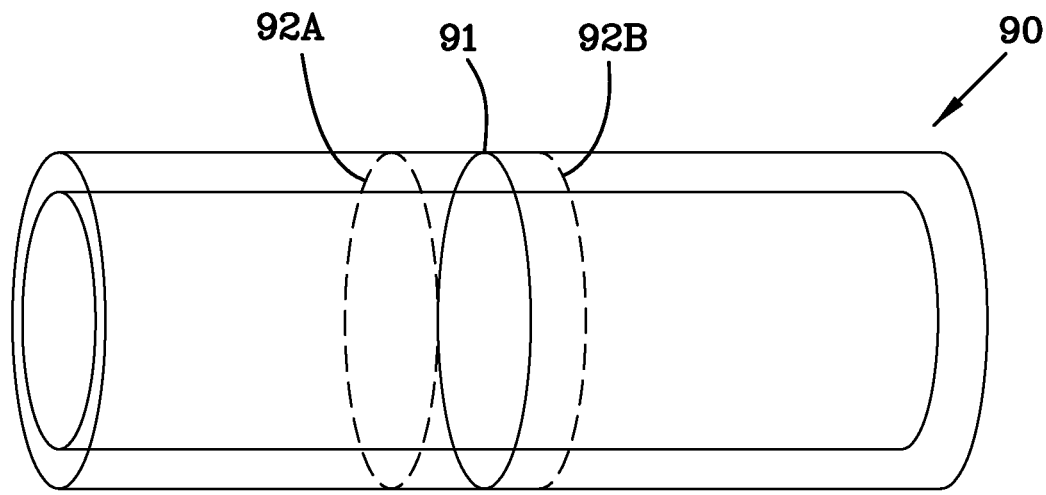
FIGS. 4 and 4A illustrate a tube for cleaving.
Figure 4A:
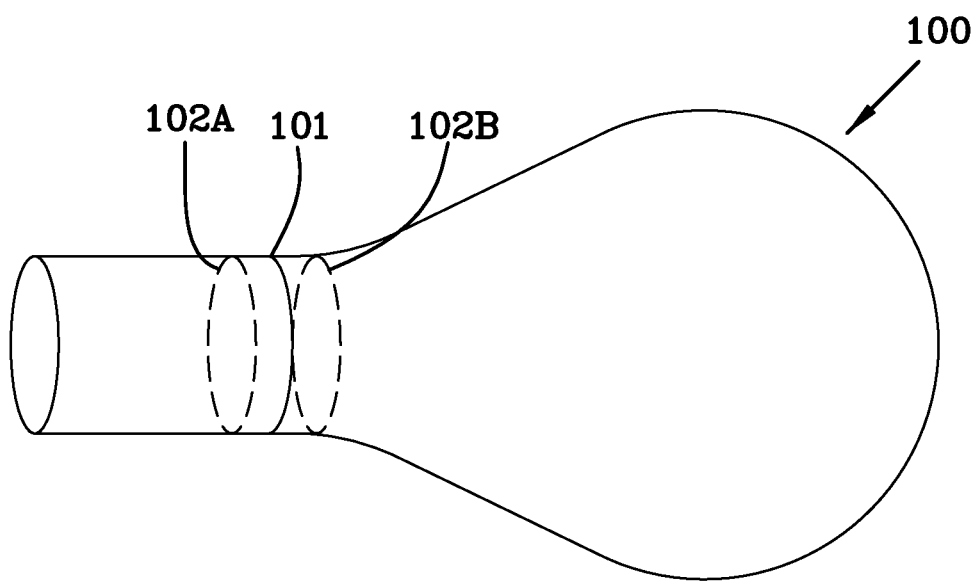

FIGS. 4 and 4A illustrate a tube for cleaving. Tubes 90 and 100 are scribed along lines 91 and 101, respectively. A $CO_2$ laser heats up the scribed line 91 in the path 92A, 92B illustrated by the dashed lines and this cause separation of tube 90. Scribed lines 91, 101 comprise a series of orifices which may or may not extend through the tubes 90 and 100. A $CO_2$ laser heats up the scribed line 101 in the path 102A, 102B illustrated by the dashed lines and this causes separation of tube 101. In the examples of FIGS. 4 and 4A, tubes 90, 100 rotate along its symmetric axis to form scribe lines 81, 101 by ultrafast burst filamentation followed by heating of the $CO_2$ laser. Other heat sources may be used to heat paths 92A, 92B and 102A, 102B.

The following description details the laser beam and the apparatus used in forming the closed forms in the substrate. The separation, once the substrate has been cut or scribed may be performed through the application of any of the above methods. As described herein, the actual scribe/cut line may be angled (beveled) with respect to the surface of the substrate. In the case of through cut closed forms it may be desirous to cut through the substrate with a downward taper so the closed form does not gravity release from the substrate upon completion of the cut. Rather, it could be raised out from above the substrate at a later time, being held in place by virtue of the circumference top of the form being larger than the bottom circumference of the substrate opening.

Any material that can undergo photoacoustic compression by filamentation can have closed forms cut and subsequently separated from that material.

The prior art method of creating a closed form and releasing it from a glass substrate requires the glass be formed into a sheet from which this glass substrate will be cut or scribed into closed forms with a diamond saw (or roller) and flexed to separate. This is the rough shaping or machining of the closed form. This is followed by the finish machining of having the closed form's edges seemed, edge ground and washed. These are expensive, time consuming steps and each step introduces a higher probability of particle contamination on the closed form by released abrasive particles in all the processes of rough machining and finishing machining.

Alternately, each closed form may be individually poured (rare) into a blank mold, although this blank will also have to have its edges ground, polished and washed. Thereafter the closed forms are individually ground to a high level of precision to achieve a level surface of smoothness commensurate to prevent cloth snagging, seal tearing etc.

The present invention allows for machining orifices or cuts in any or each member of a stacked array of materials by a novel method using burst(s) of ultrafast laser pulses wherein the laser light and focusing parameters have been adjusted to create a filament inside the material that can create an orifice of specified depth and width at the desired point of initiation and point of termination. Specifically, it offers the following considerable advances over the prior art: smoother cut faces, minimal microcrack propagation, longer/deeper orifice creation, non-tapered orifices, nonlinear absorption, orifices with a consistent internal diameter, minimized entrance distortion and reduced collateral damage.

The main objective of the present invention is to provide a method for the fast, precise, and economical non-ablative laser machining to scribe or cut closed forms from transparent materials by filamentation by a burst(s) of ultrafast laser pulses, and then to release these forms from the material. The apparatus and methodology employed in cutting/scribing the closed forms in the material for eventual release will be detailed herein as the closed form methodology, and the cleaving system.

Ultrafast pulse lasers offer high intensity to micromachine, to modify and to process surfaces cleanly by aggressively driving multiphoton, tunnel ionization, and electron-avalanche processes. The process supplies enough energy in the transparent material of the target, less than that used in ablative drilling, but beyond the critical energy level to initiate self-focusing towards formation of filament inside the substrate so as to cause photoacoustic compression that modifies the index of refraction at the focal points in the material and does not encounter optical breakdown (as encountered by the prior art ablative scribing systems) such that continued refocusing of the laser beam in the target material can continue over long distances, enough so that even multiple stacked substrates can be drilled, scribed simultaneously with negligible taper over the drilled distance, a relatively smooth orifice wall and can initiate from above, below or within the target material. The filament formed by the fabrication unit's direction/steering can be used to drill orifices, cut, scribe or dice a surface or volume of a target.

The Closed Form Methodology

Utilizing the above detailed laser machining technology in conjunction with the ability of the computerized laser machining system to precisely focus the filamentation formed in the substrate by the burst of ultrafast laser pulses allows for precise, economical closed form cutting (perforating) that need not create planar facets. Altering the filament relative to the substrate allows for unlimited full or partial cuts to be made at a plethora of angles relative to the substrate's surface. Because of the computerized 3D modeling capability and the precision of cuts, a plethora of closed forms can be cut incorporating both acute and obtuse angles.

The release of the closed form may be via direct pressure whether applied mechanically or via a gas or fluid urging, or it may be accomplished by the momentary distortion of the substrate. It may also be accomplished by the application of a heat or cold source to any part of the substrate or closed form. If the material used and the closed form respond better to a differential temperature across the cut/scribe line, then both hot and cold sources may simultaneously be used.

The method for machining and releasing closed forms from a transparent, brittle substrate proceeds with the following steps:

providing a transparent substrate; providing ultrafast laser pulses in a beam comprising a burst of laser pulses;

providing a laser beam delivery system capable of focusing the laser beam onto the substrate and to enable relative patterned movement between the laser beam and the substrate;

focusing the laser beam relative to the substrate to form a beam waist at a location that is external to the substrate, wherein the laser pulses incident on the surface of the substrate are focused such that a sufficient energy density is maintained within the substrate to form a continuous laser filament therethrough without causing optical breakdown;

propagating an orifice about the filament that traverses completely or partially through a section of the substrate by photoacoustic compression;

enabling relative movement between the focused laser beam and the substrate with the laser beam delivery system, so as to move the location of the laser filament creating the orifice in the substrate to make a cut through the substrate;

directing the laser filament in the substrate to trace out a closed form pattern in the substrate as the cut progresses about the substrate; and, applying a heat source to the region of the closed form pattern cut in the substrate until the closed form separates from the substrate.

It is to be noted that the cleaving laser needs to be focused correctly so as to avoid any damages on the surface or inside the material along the scribe line. Heating can be done on the surface using longer wavelength lasers such as $CO_2$ (substrate is opaque to $CO_2$ wavelength), or inside using lasers with wavelengths transmit through the substrate, in this case a bulk of material along the scribe line is heated.

For inner closed forms such as small circles or pockets where the body is the final product and inner circle won't be used, it is more practical to melt the cutout using heat of $CO_2$ beam and let the substrate cool down. Again, a release line will form along the scribe line and the inner cutout will be dropped by gravity, or a mechanical finger or air pressure will be used.

The Cleaving System

All the laser machining systems have at least two things in common:

they change the location of the incident laser beam on the work piece; and, they allow for the adjustment of the various laser focusing, power and delivery parameters.

The system may:

move the work piece about the laser beam (i.e. using a table translatable in the X-Y plane);

may move the laser beam about the work piece (i.e. through steering mirrors or gantry bridge); or, may utilize a combination of both techniques.

Figure 5:
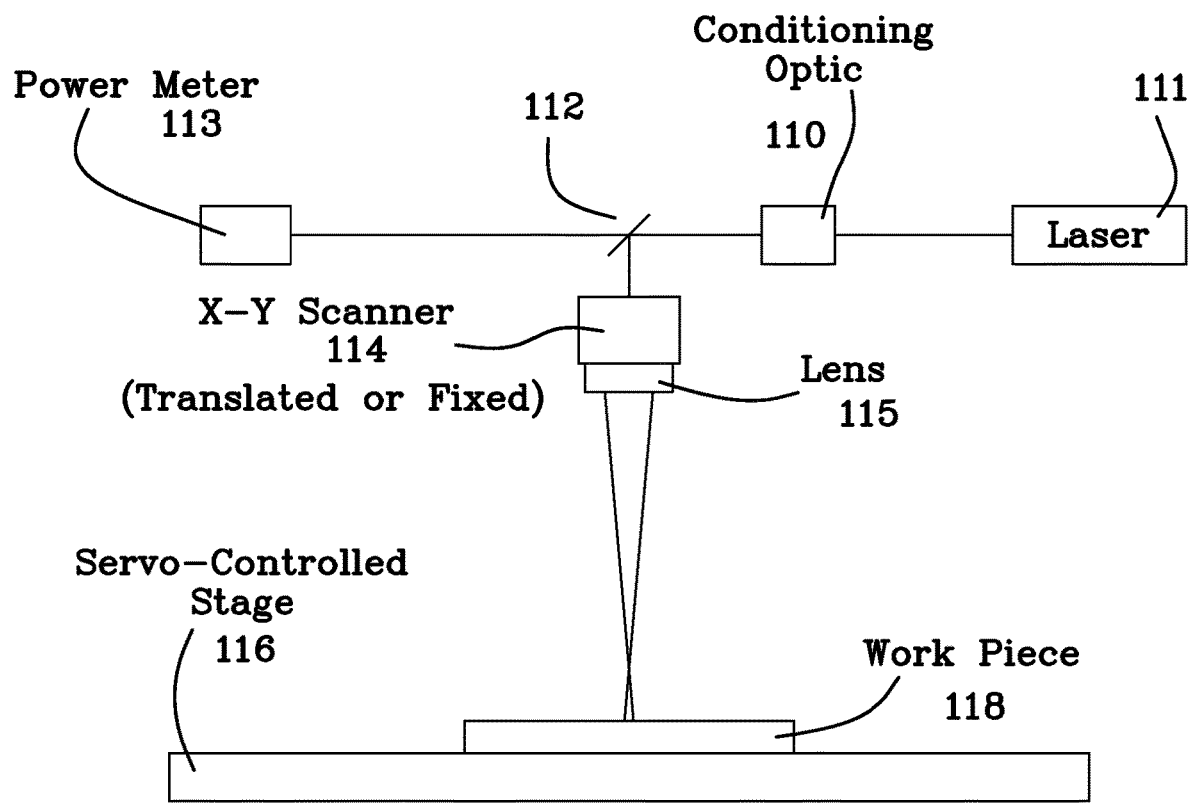
FIG. 5 represents an example of a laser machining system capable of forming heat in the glass substrate of HDD platters or sheets.

FIG. 5 represents an example of a laser machining system 111 capable of forming heat in the glass substrate of HDD platters or sheets. It includes a $CO_2$ or fiber or solid state laser 111, equipped with a suitable collection of beam steering optics, such that the laser beam can be delivered to a multi-axis rotation and translation stage including: a rotational stage in the XY plane (theta, θ), a 3D XYZ translational stage, and an axis for tipping the beam or the part relative to the X axis (gamma, γ) in a coordinated control architecture. In the example embodiment shown, the beam is manipulated by conditioning optic 110 (e.g. a positive or negative lens or combination of lenses capable of delivering a weakly focused spot that can be further conditioned or manipulated), beam sampling mirror 112, power meter 113, X-Y scanner 114, final focusing lens 115, and servo-controlled stage 116 for positioning workpiece 117. Laser spot position and depth may be controlled by an auto-focus configuration (e.g. using a position-sensing device) that maintains a constant working distance over curved or uneven surfaces, such as may be the case with automobile windows or other glass parts.

Figure 6:
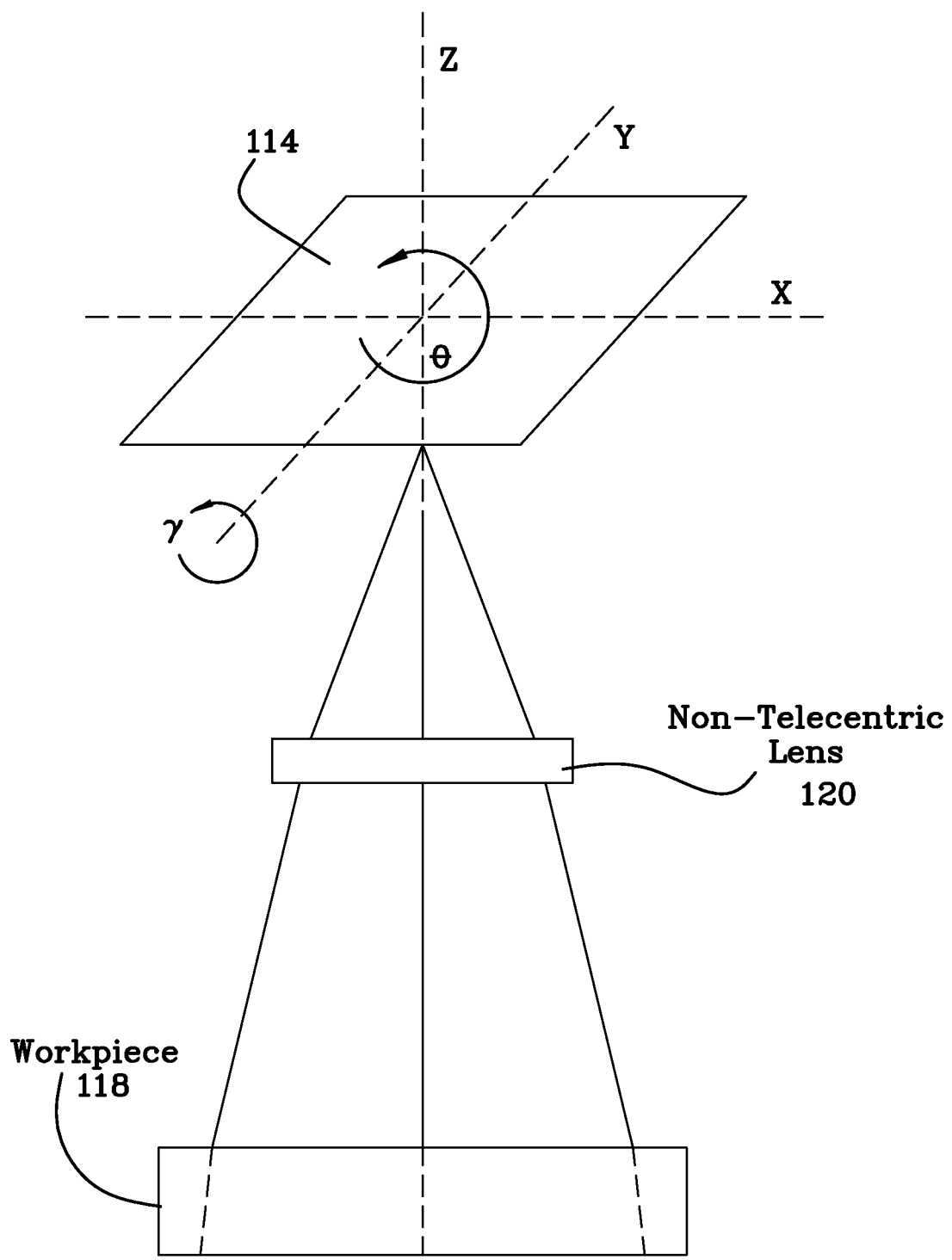
FIG. 6 illustrates an example embodiment showing the ability to control multiple axes via a control of stage of the X-Y scanner using non-telecentric lens.
Figure 7:
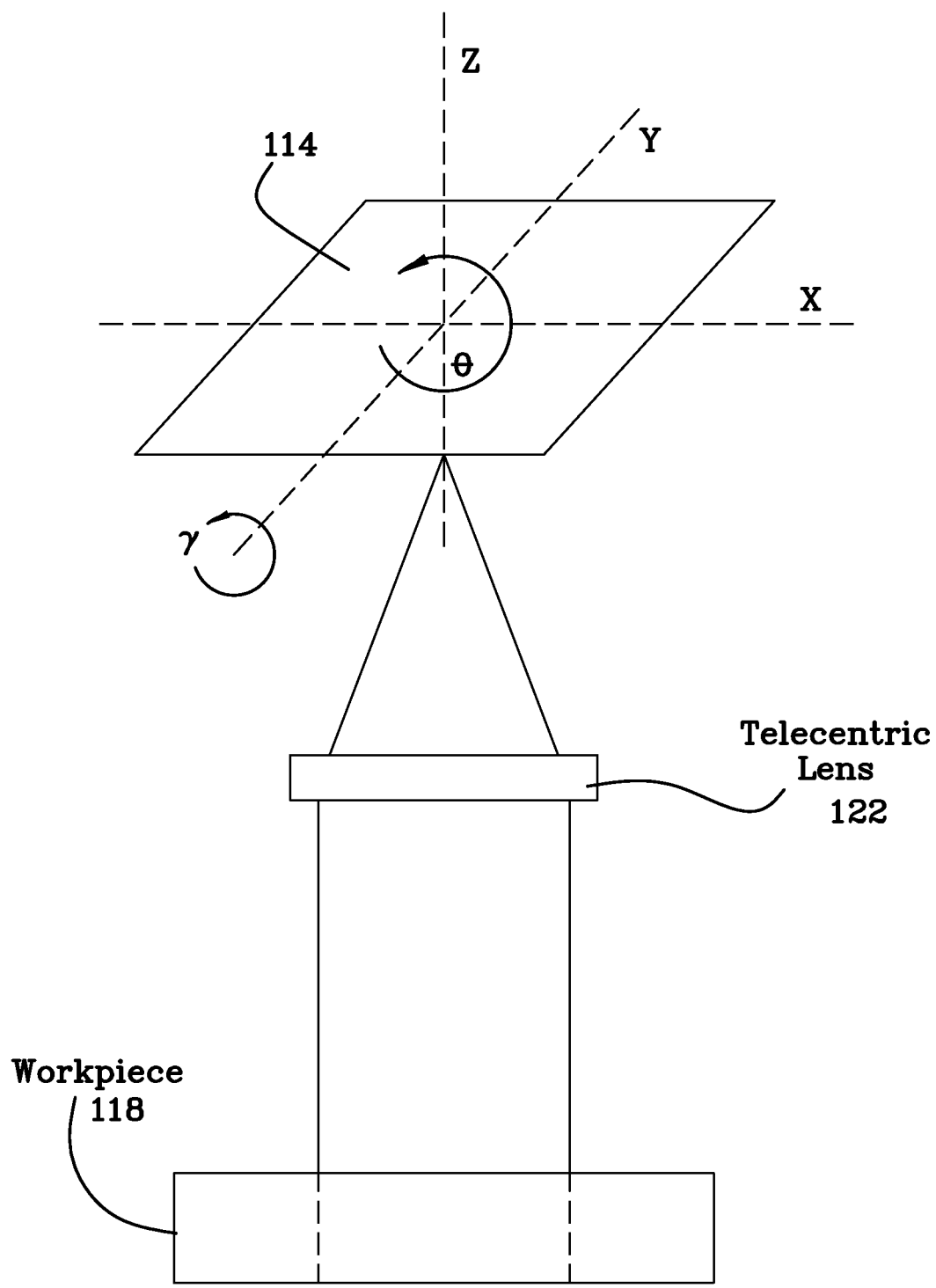
FIG. 7 illustrates an example embodiment showing the ability to control multiple axes via a control of stage of the X-Y scanner using telecentric lens.

FIGS. 6 and 7 illustrate example embodiments showing the ability to control multiple axes via a control of stage of the X-Y scanner 114, using non-telecentric 120 lens (FIG. 6) and telecentric lens 122 (FIG. 7). It is to be understood that other optical configurations are possible. It is these angled or beveled cuts or scribes that may be utilized to prevent fully cut closed forms from dropping out from the substrate via gravity or air pressure or mechanical force, as described herein.

Figure 8A:
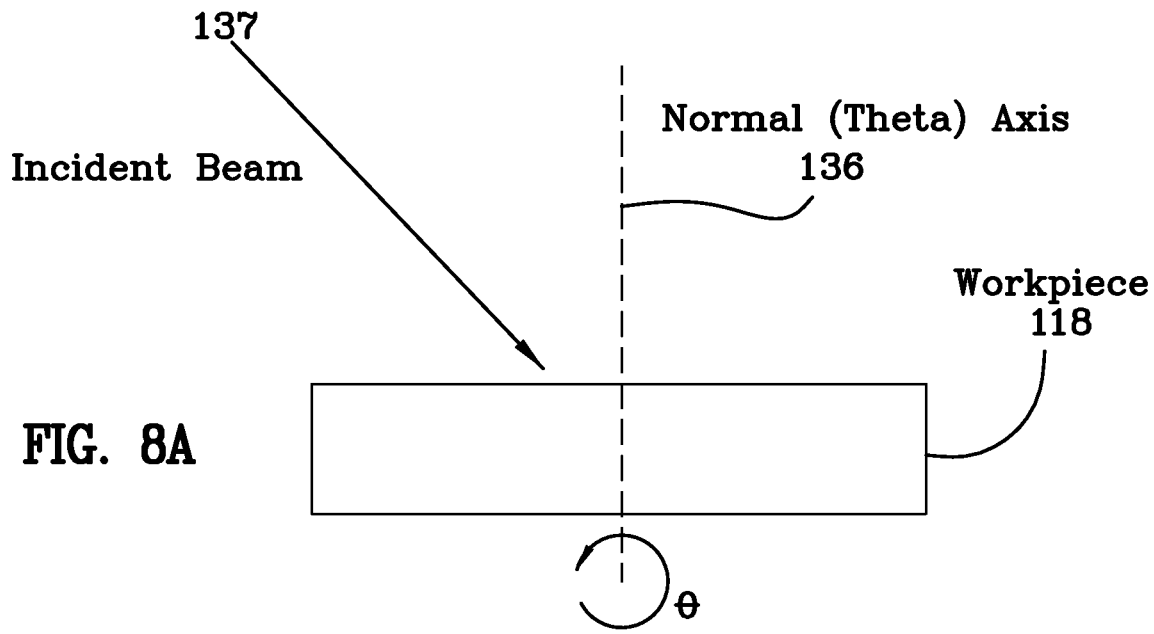
FIGS. 8(a)-(d) show the angled cut out approach for making internal features with angled edges requiring no post singulation processing to achieve the desired angular result.
Figure 8B:
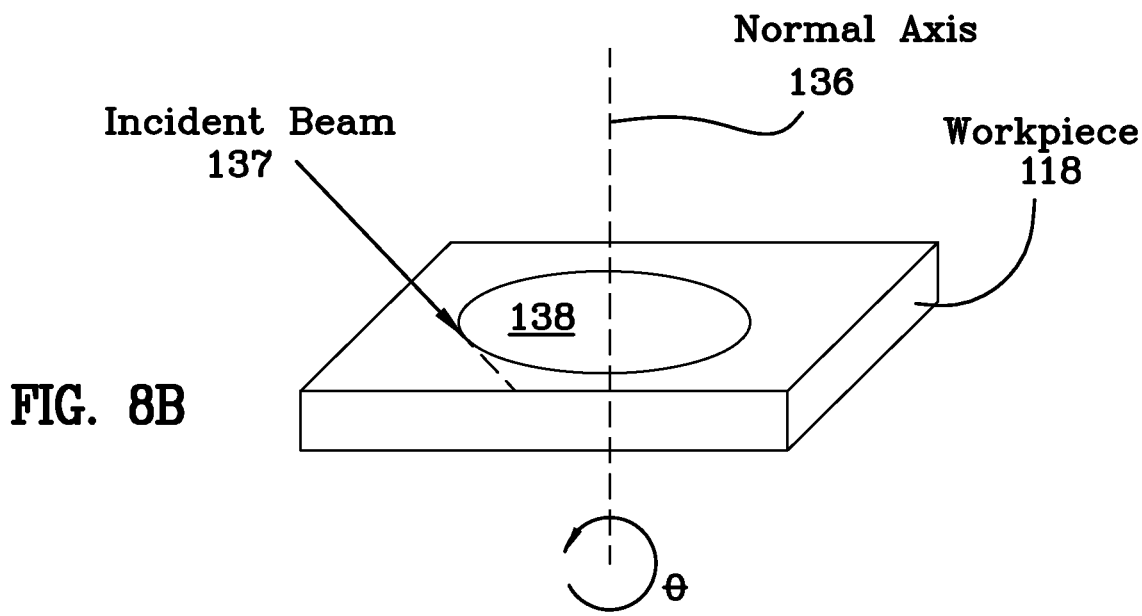
Figure 8C:

FIGS. 8(a)-(d) show an angled cut out for making internal features with angled edges requiring no post singulation processing to achieve the desired angular result. In FIGS. 8(a)-(c), the beam track is accomplished via rotation around the theta axis 136 with a fixed incidence angle laser beam 137, equal to the slope desired on the final part edge 138. This non-limiting embodiment enables angled cutting and translation of the rotary stage as an apparatus to support the creation of heat in the center of complex cutouts via filament arrays. The orifices may extend partially or completely through the substrate as described hereinabove.

Figure 8D:
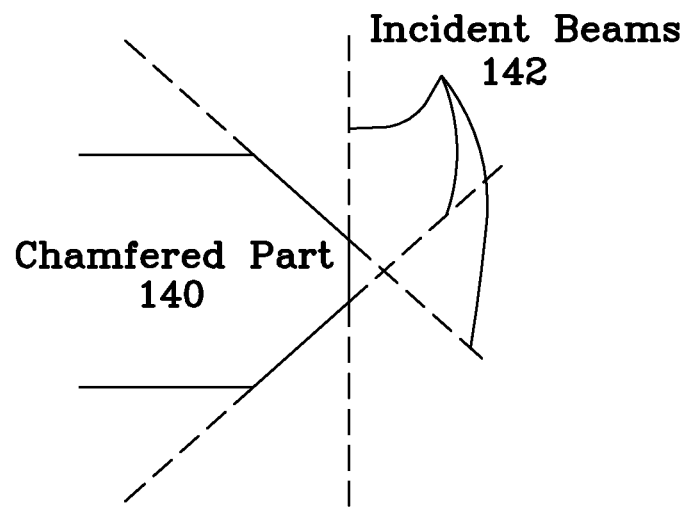

FIG. 8(d) illustrates an example implementation of the formation of a chamfered part 140 via processing with multiple filament forming beams 142 at different angles after volume or surface heat cleaving. It is to be understood that the beam and filament paths can be controlled to form chamfered or bevel edges of various degrees. In the case of concerted (parallel) formation, the beam can be split and directed through optics to achieve multiple beam paths arriving at the target exhibiting angles of incidence other than normal, along with a normally incident beam, such that a three-face edge or chamfer is created.

Figure 8E:
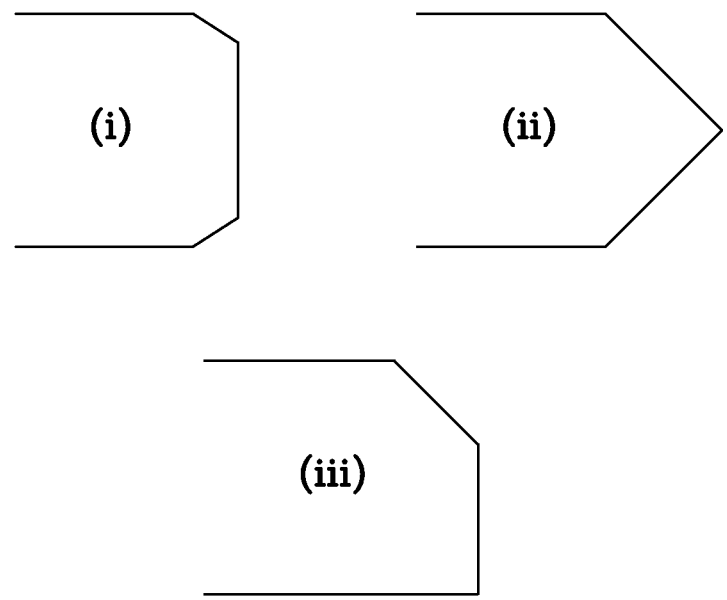
FIG. 8(e) illustrates that chamfers can be created with two or more faces, depending, for example, on the degree of splitting tolerated by the process.

It is to be understood that chamfers can be created with two or more faces, depending, for example, on the degree of splitting tolerated by the process. Some example configurations are illustrated in FIG. 8(e).

In some embodiments, as described below, the laser processing system can be configured such that one laser (with beam splitting optics) can perform both scribing steps simultaneously, provided that the laser has sufficient power. It has been found, for example, that a laser with an average power of approximately 75 W is sufficient to perform all processing steps simultaneously, then another high power laser can be used to perform cleaving via beam splitting.

The aforementioned apparatus, with multi-axis rotational and translational control, when utilizing laser pulses to accomplish surface of volume heat may be employed for the purpose of bringing the beam on to the work piece(s) at variable focus positions, non-normal angles of incidence and at variable, recipe controlled positions to create curvilinear zones of heat along filament arrays, for the purpose of cutting out closed-form shapes to create products such as smart phone cover glass, glass HDD platters (from bare glass or magnetic media covered glass substrate), automobile windows, etc. This is presently not possible using the laser ablative machining techniques currently employed. Those skilled in the art will recognize that all of these axes are not required for all applications and that some applications will benefit from having simpler system constructions. Furthermore, it is to be understood that the apparatus shown is but one example implementation of the embodiments of the present disclosure, and that such embodiments may be varied, modified or hybridized for a wide variety of substrates, applications and part presentation schemes without departing from the scope of the present disclosure.

It is to be understood that the invention is not limited in its application to the arrangements of the components set forth in the following description or illustrated in the drawings. The invention is capable of other embodiments and of being practiced and carried out with various differently ordered steps. For example, several methods of releasing the closed form from the substrate have been detailed, it is well known in the art that the heating source applied could also be used to temper or anneal the substrate, thus allowing the manufacturer to combine the annealing and separation steps.

Also, it is to be understood that the phraseology and terminology employed herein are for the purpose of descriptions and should not be regarded as limiting. As such, those skilled in the art will appreciate that the disclosure may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

The invention claimed is:

1. A method for machining and releasing closed forms from a substrate, comprising the following steps:

providing a substrate;

providing a first laser beam from a first laser source having bursts of ultrafast laser pulses, said substrate made of a material that is transparent to said first laser beam;

providing a laser beam delivery system including an aberrated lens and enabling relative movement between said first laser beam and said substrate;

focusing said first laser beam using said laser beam delivery system in a distributed manner along a longitudinal beam axis, said distributed focusing creating a plurality of foci that are spatially extended along said longitudinal beam axis, said focused first laser beam having sufficient fluence to initiate self-focusing of said first laser beam, each burst thereof generating a laser filament that propagates along said longitudinal beam axis, said spatially extended foci maintaining said self-focusing, each laser filament creating a void by annularly compressing said material about said longitudinal beam axis;

moving said first laser beam relative to said substrate to create a closed form in said substrate, said closed form outlined by a scribed line of spaced apart voids, said voids extending completely through said substrate, said closed form being a desired part;

applying a second laser beam from a second laser source to heat a region in vicinity of said scribed line, said substrate outside of said scribed line being heated by said second laser beam more than said closed form; and moving said second laser beam relative to said substrate, said heating causing said region to expand and creating a cleave along said scribed line, said closed form releases from said substrate due to contraction when said substate cools, said heating by said second laser beam being sufficient to cause separation at said scribed line.

2. The method for machining and releasing closed forms from a substrate as claimed in claim 1, wherein said second laser source is a $CO_2$ laser.

3. The method for machining and releasing closed forms from a substrate as claimed in claim 1, wherein said second laser beam forms a spot on said substrate having a diameter in a range of 100 µm to 10 mm.

4. The method for machining and releasing closed forms from a substrate as claimed in claim 3, wherein said spot on said substrate has a diameter of 8 mm, 6 mm of said spot resides outside of said scribed line and 2 mm of said spot resides on said closed form.

5. The method for machining and releasing closed forms from a substrate as claimed in claim 1, wherein said voids are spaced apart by between 2 and 10 µm center to center.

6. The method for machining and releasing closed forms from a substrate as claimed in claim 1, wherein said second laser beam being applied outside said scribed line.

7. A method for machining and releasing closed forms from a substrate, comprising the following steps:

providing a substrate;

providing a first laser beam from a first laser source having bursts of ultrafast laser pulses, said substrate made of a material that is transparent to said first laser beam;

providing a laser beam delivery system including an aberrated lens and enabling relative movement between said first laser beam and said substrate;

focusing said first laser beam using said laser beam delivery system in a distributed manner along a longitudinal beam axis, said distributed focusing creating a plurality of foci that are spatially extended along said longitudinal beam axis, said focused first laser beam having sufficient fluence to initiate self-focusing of said first laser beam, each burst thereof generating a laser filament that propagates along said longitudinal beam axis, said spatially extended foci maintaining said self-focusing, each laser filament creating a void by annularly compressing said material about said longitudinal beam axis;

moving said first laser beam relative to said substrate to create a closed form in said substrate, said closed form outlined by a scribed line of spaced apart voids, said voids extending completely through said substrate, said closed form is an internal feature being cut out of a desired part;

applying a second laser beam from a second laser source inside said scribed line to heat a region in vicinity of said scribed line;

moving said second laser beam relative to said substrate, said closed form heating, melting, and deforming; and stopping application of said second laser beam, said closed form cooling and shrinking, releasing said closed form from said substrate, said heating by said second laser beam being sufficient to cause separation at said scribed line.

8. The method for machining and releasing closed forms from a substrate as claimed in claim 1, wherein said substrate is made of glass.

* * * * *